US012641418B2

(12) United States Patent (10) Patent No.: US 12,641,418 B2
Guo et al. (45) Date of Patent: May 26, 2026

(54) COMMUNICATION METHOD, APPARATUS, AND SYSTEM

(71) Applicant: HUAWEI TECHNOLOGIES CO., LTD., Shenzhen (CN)

(72) Inventors: Longhua Guo, Shanghai (CN); He Li, Shanghai (CN); Rong Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 700 days.

(21) Appl. No.: 17/837,476

(22) Filed: Jun. 10, 2022

(65) Prior Publication Data

US 2022/0303763 A1 Sep. 22, 2022

Related U.S. Application Data

(63) Continuation of application No. PCT/CN2019/125373, filed on Dec. 13, 2019.

(51) Int. Cl.
*H04W 12/03* (2021.01)

(52) U.S. Cl.
CPC .................................... *H04W 12/03* (2021.01)

(58) Field of Classification Search
CPC ... H04W 12/03; H04W 40/22; H04W 12/106; H04W 80/02; H04W 84/047; H04W 12/037; Y02D 30/70
See application file for complete search history.

(56) References Cited

U.S. PATENT DOCUMENTS 10,512,005 B2 * 12/2019 Horn ................. H04W 36/0038
10,700,775 B2 * 6/2020 Novlan ............... H04B 7/15592

11,751,047 B2 * 9/2023 Teyeb ................... H04W 12/03
726/3
2019/0349079 A1 * 11/2019 Novlan .............. H04B 7/15542
2021/0377805 A1 * 12/2021 Liu ........................ H04W 72/21
2022/0124502 A1 * 4/2022 Jactat .................. H04W 12/106
(Continued)

FOREIGN PATENT DOCUMENTS

| CN | 110381608 A | 10/2019 |
| CN | 110475267 A | 11/2019 |
| CN | 110536350 A | 12/2019 |

(Continued)

OTHER PUBLICATIONS

3GPP TR 33.824 V0.3.0 (Jun. 2019), 3rd Generation Partnership Project; Technical Specification Group Services and System Aspects; Study on Security for NR Integrated Access and Backhaul; (Release 16), 21 pages.

(Continued)

*Primary Examiner* — Khalid M Almaghayreh

(74) *Attorney, Agent, or Firm* — HAUPTMAN HAM, LLP

(57) ABSTRACT

A communication method, apparatus, and system. The method includes after a second node sends first indication information to a first node by using a message that is not security protected, the first node requests an Integrated Access and Backhaul (IAB) donor node to verify whether the first indication information is trustworthy, so that the first node performs a subsequent operation based on a verification result of the IAB donor node. This eliminates a security risk in a communication process, and help improve communication quality.

20 Claims, 13 Drawing Sheets

(56) References Cited

U.S. PATENT DOCUMENTS

2025/0184724 A1*  6/2025  Jost ....................... H04L 63/062

FOREIGN PATENT DOCUMENTS

CN       110381608 B  *  6/2021  ........... H04W 12/02
WO       2019162489 A1    8/2019

OTHER PUBLICATIONS

Catt, Summary of the email discussion [106#43][IAB] Backhaul RLF. 3GPP TSG-RAN WG2 Meeting #107 , Prague, Czech Republic, Aug. 26-30, 2019, R2-1908842, 55 pages.
3GPP TR 38.874 V0.6.2 (Nov. 2018), 3rd Generation Partnership Project; Technical Specification Group Radio Access Network; Study on Integrated Access and Backhaul; (Release 15), 94 pages.
Intel Corporation, Flow Control mechanism for DL. 3GPP TSG RAN WG2 Meeting #106, Reno, U.S.A., May 13-17, 2019, R2-1906353, 4 pages.
3GPP TR 38.874 V16.0.0 (Dec. 2018), 3rd Generation Partnership Project; Technical Specification Group Radio Access Network; NR; Study on Integrated Access and Backhaul;(Release 16), 111 pages.
3GPP TS 38.401 V15.6.0 (Jul. 2019), 3rd Generation Partnership Project; Technical Specification Group Radio Access Network; NG-RAN; Architecture description(Release 15), 46 pages.
International Search Report issued in corresponding International Search Report PCT/CN2019/125373, dated Aug. 28, 2020, pp. 1-9.
Samsung, [Draft Cr] F1 interface set-up procedure. 3GPP TSG-SA3 Meeting# 97, Reno, US, Nov. 18-22, 2019, S3-194373, 3 pages.
3GPP TR 33.824 V0.6.0 (Nov. 2019), 3rd Generation Partnership Project; Technical Specification Group Services and System Aspects; Study on Security for NR Integrated Access and Backhaul; (Release 16), 22 pages.
3GPP TS 33.501 V16.0.0 (Sep. 2019), 3rd Generation Partnership Project; Technical Specification Group Services and System Aspects; Security architecture and procedures for 5G system(Release 16), 196 pages.
Extended European Search Report issued in corresponding European Application No. 19955938.6, dated Oct. 18, 2022, pp. 1-11.

* cited by examiner

COMMUNICATION METHOD, APPARATUS, AND SYSTEM

CROSS-REFERENCE TO RELATED APPLICATIONS

This application is a continuation of International Application No. PCT/CN2019/125373, filed on Dec. 13, 2019, which is hereby incorporated in entirety by reference.

BACKGROUND

To reduce construction burden of a wired transmission network and provide flexible and dense new radio (new radio, NR) deployment, an integrated access and backhaul (integrated access and backhaul, IAB) technology is proposed in 5th generation (5th generation, 5G) new radio (new radio, NR).

An IAB architecture includes two types of nodes, which are respectively an IAB donor (IAB-donor) node and an IAB node (IAB-node). An effect and a function of the IAB donor node are similar to those of a conventional base station. The IAB donor node provides a terminal device interface to a core network (core network, CN), and supports a wireless backhaul (wireless backhaul) function of the IAB node. The IAB node supports wireless access of a terminal device and wireless backhaul of data.

Currently, information transmitted between the two IAB nodes is not security protected. Consequently, a security risk exists in a communication process, and communication quality is reduced.

SUMMARY

This application provides a communication method, apparatus, and system, to ensure security of data transmission between IAB nodes, thereby improving communication quality.

According to a first aspect, this application provides a communication method, including: A first node receives a first message from a second node, where the first message includes first indication information, the first message is not security protected, and both the first node and the second node are integrated access and backhaul IAB nodes; the first node sends a second message to an IAB donor node, where the second message is used to indicate that the first node receives the first indication information, and the second message is security protected; and the first node receives a third message from the IAB donor node, where the third message includes second indication information, the second indication information is used to indicate whether the first indication information is trustworthy, and the third message is security protected.

In the foregoing solution, after the second node sends the first indication information to the first node by using the message that is not security protected, the first node requests the IAB donor node to verify whether the first indication information is trustworthy, so that the first node performs a subsequent operation based on a verification result of the IAB donor node. For example, when determining that the first indication information is trustworthy, the first node performs a corresponding operation based on the first indication information; otherwise, the first node does not perform a corresponding operation. This eliminates a security risk in a communication process, and help improve communication quality.

In a possible implementation method, the first message further includes an identifier of a third node, the first indication information is used to indicate that a signal transmission exception occurs on the third node, and the third node is an IAB node; and the second message further includes the identifier of the third node, and that the second message is used to indicate that the first node receives the first indication information includes: the second message is used to indicate that the first node receives the first indication information from the third node.

In a possible implementation method, the identifier of the third node is an address of the third node or an identifier of a first path corresponding to the third node, the first path is a path on which a signal transmission exception occurs, and the first path includes the third node.

In a possible implementation method, that the second message is used to indicate that the first node receives the first indication information includes: The second message includes third indication information, and the third indication information is used to indicate that the first node receives the first indication information.

In a possible implementation method, the first message is an internet protocol IP layer message, an adaptation Adapt layer message, a radio link control RLC message, a media access control MAC message, or a physical PHY layer message; the second message is an F1 application protocol F1AP layer message, a stream control transmission protocol SCTP layer message, or an internet protocol security IPsec layer message; and the third message is an F1AP layer message, an SCTP layer message, or an IPsec layer message.

According to a second aspect, this application provides a communication method, including: An IAB donor node receives a second message from a first node, where the second message is used to indicate that the first node receives first indication information, the second message is security protected, and the first node is an IAB node; the IAB donor node determines whether the first indication information is trustworthy; and the IAB donor node sends a third message to the first node, where the third message includes second indication information, the second indication information is used to indicate whether the first indication information is trustworthy, and the third message is security protected.

In the foregoing solution, after the second node sends the first indication information to the first node by using a message that is not security protected, the first node requests the IAB donor node to verify whether the first indication information is trustworthy, so that the first node performs a subsequent operation based on a verification result of the IAB donor node. For example, when determining that the first indication information is trustworthy, the first node performs a corresponding operation based on the first indication information; otherwise, the first node does not perform a corresponding operation. This eliminates a security risk in a communication process, and help improve communication quality.

In a possible implementation method, the second message further includes an identifier of a third node, the identifier of the third node is an address of the third node or an identifier of a first path corresponding to the third node, the first path is a path on which a signal transmission exception occurs, and the first path includes the third node; and that the second message is used to indicate that the first node receives first indication information includes: the second message is used to indicate that the first node receives the first indication information from the third node.

In a possible implementation method, that the IAB donor node determines whether the first indication information is trustworthy includes:

The IAB donor node determines that the signal transmission exception occurs on the first path, and determines that the first indication information is trustworthy.

In a possible implementation method, the IAB donor node receives fourth indication information from the third node, where the fourth indication information is used to indicate that the signal transmission exception occurs on the first path.

In a possible implementation method, that the second message is used to indicate that the first node receives first indication information includes: The second message includes third indication information, and the third indication information is used to indicate that the first node receives the first indication information.

According to a third aspect, this application provides a communication method, including: An IAB donor node receives a first message from a first node, where the first message includes first indication information, the first message is security protected, and the first node is an IAB node; the IAB donor node determines a second node based on the first indication information, where the second node is an IAB node; and the IAB donor node sends a second message to the second node, where the second message includes second indication information, the second message is security protected, and the second indication information corresponds to the first indication information.

Based on the foregoing solution, the IAB node sends the first indication information to the IAB donor node by using the security protected first message, then the IAB donor node obtains the second indication information based on the first indication information, and sends the second indication information to the another IAB node by using the security protected second message. In this process, the IAB donor node is used as a bridge for information transmission between the two IAB nodes, so that security protection is performed on information transmitted between the IAB nodes. This eliminates a security risk in a communication process, and help improve communication quality.

In a possible implementation method, the first message further includes information about a first path, the first indication information is used to indicate that a signal transmission exception occurs on the first path, and the first path includes the first node; and that the IAB donor node determines a second node based on the first indication information includes: the IAB donor node determines, based on the first indication information, information about a network topology, and the information about the first path, the second node that is in the network topology and that is affected by the signal transmission exception, where the information about the network topology includes a connection relationship between the IAB donor node and at least two IAB nodes, and the network topology includes the first path.

In a possible implementation method, the first path further includes a third node, and the information about the first path includes an address of the third node and an address of the first node; or the information about the first path includes an identifier of the first path.

According to a fourth aspect, this application provides a communication method, including: A first node receives a first derivation parameter from an IAB donor node, where the first derivation parameter includes one or more of the following: a C-RNTI of the first node, a DU identifier of a second node, and a DU name of the second node, the first node is an IAB node, the second node is an IAB node connected to the first node, and the first node accesses the IAB donor node through the second node; and the first node derives a shared key between the first node and the second node based on a root key and the first derivation parameter, where the shared key is used to encrypt information transmitted between the first node and the second node.

Based on the foregoing solution, the information transmitted between the two IAB nodes is encrypted by using the shared key. This eliminates a security risk in a communication process, and help improve communication quality.

In a possible implementation method, the root key is a key at an IAB node granularity, a key at an IAB donor node granularity, or a key at an access and mobility management function AMF granularity.

In a possible implementation method, the first node receives first indication information from the IAB donor node, where the first indication information is used to indicate to delete the shared key between the first node and the second node; and the first node deletes the shared key based on the first indication information.

In a possible implementation method, after receiving a connection reconfiguration message from the IAB donor node, the first node deletes the shared key between the first node and the second node, where the connection reconfiguration message is used to indicate the first node to establish a connection to a third node, and the third node is different from the second node; or after sending a connection reconfiguration complete message to the IAB donor node, the first node deletes the shared key between the first node and the second node, where the connection reconfiguration complete message is used to indicate that the first node completes establishment of a connection to a third node.

According to a fifth aspect, this application provides a communication method, including: An IAB donor node determines a first derivation parameter, where the first derivation parameter includes one or more of the following: a cell radio network temporary identifier C-RNTI of a first node, a distributed unit DU identifier of a second node, and a DU name of the second node, the first node is an IAB node, the second node is an IAB node, the second node is connected to the first node, and the first node accesses the IAB donor node through the second node; and the IAB donor node sends the first derivation parameter to the first node, where the first derivation parameter is used to derive a shared key between the first node and the second node, and the shared key is used to encrypt information transmitted between the first node and the second node.

Based on the foregoing solution, the information transmitted between the two IAB nodes is encrypted by using the shared key. This eliminates a security risk in a communication process, and help improve communication quality.

In a possible implementation method, the IAB donor node derives the shared key based on a root key and the first derivation parameter, and the IAB donor node sends the shared key to the second node; the IAB donor node sends the first derivation parameter to the second node, where the first derivation parameter is used to derive the shared key; or the IAB donor node sends, to the second node, an intermediate key and a second derivation parameter in the first derivation parameter, where the intermediate key and the second derivation parameter are used to derive the shared key, the intermediate key is derived based on the root key and a third derivation parameter in the first derivation parameter, and the third derivation parameter is a derivation parameter other than the second derivation parameter in the first derivation parameter.

In a possible implementation method, the root key is a key at an IAB node granularity, a key at an IAB donor node granularity, or a key at an access and mobility management function AMF granularity.

According to a sixth aspect, this application provides a communication method, including: A first node receives a root key from an IAB donor node, where the root key is a root key at an IAB donor node granularity or an access and mobility management function AMF granularity, and the first node is an IAB node; and the first node derives a shared key between the first node and a second node based on the root key and a shared parameter between the first node and the second node, where the shared key is used to encrypt information transmitted between the first node and the second node, and the first node is connected to the second node.

Based on the foregoing solution, the information transmitted between the two IAB nodes is encrypted by using the shared key. This eliminates a security risk in a communication process, and help improve communication quality.

In a possible implementation method, the shared parameter includes one or more of the following: a backhaul adaptation protocol BAP layer parameter of the first node, a BAP layer parameter of the second node, a radio link control RLC layer shared parameter between the first node and the second node, and a shared parameter between a DU of the first node and an MT of the second node.

In a possible implementation method, the first node deletes the root key after disconnecting from the IAB donor node.

According to a seventh aspect, this application provides a communication apparatus. The apparatus is an IAB node, or is a chip used in the IAB node. The apparatus has a function of implementing the first aspect, the fourth aspect, the sixth aspect, the embodiments of the first aspect, the embodiments of the fourth aspect, or the embodiments of the sixth aspect. The function is implemented by hardware, or is implemented by hardware executing corresponding software. The hardware or the software includes one or more modules corresponding to the function.

According to an eighth aspect, this application provides a communication apparatus. The apparatus is an IAB donor node, or is a chip used in the IAB donor node. The apparatus has a function of implementing the second aspect, the third aspect, the fifth aspect, the embodiments of the second aspect, the embodiments of the third aspect, or the embodiments of the fifth aspect. The function is implemented by hardware, or is implemented by hardware executing corresponding software. The hardware or the software includes one or more modules corresponding to the function.

According to a ninth aspect, this application provides a communication apparatus, including a processor and a memory. The memory is configured to store computer-executable instructions. When the apparatus runs, the processor executes the computer-executable instructions stored in the memory, so that the apparatus performs the methods according to the first aspect to the sixth aspect or the embodiments of the first aspect to the sixth aspect.

According to a tenth aspect, this application provides a communication apparatus, including units or means (means) configured to perform the steps in the first aspect to the sixth aspect or the embodiments of the first aspect to the sixth aspect.

According to an eleventh aspect, this application provides a communication apparatus, including a processor and an interface circuit. The processor is configured to: communicate with another apparatus through the interface circuit, and perform the methods according to the first aspect to the sixth aspect or the embodiments of the first aspect to the sixth aspect. There are one or more processors.

According to a twelfth aspect, this application provides a communication apparatus, including a processor, configured to be connected to a memory, and configured to invoke a program stored in the memory, to perform the methods according to the first aspect to the sixth aspect or the embodiments of the first aspect to the sixth aspect. The memory is located inside the apparatus, or is located outside the apparatus. In addition, there are one or more processors.

According to a thirteenth aspect, this application further provides a computer-readable storage medium. The computer-readable storage medium stores instructions. When the instructions are run on a computer, a processor is enabled to perform the methods according to the first aspect to the sixth aspect or the embodiments of the first aspect to the sixth aspect.

According to a fourteenth aspect, this application further provides a computer program product including instructions. When the computer program product runs on a computer, the computer is enabled to perform the methods according to the first aspect to the sixth aspect or the embodiments of the first aspect to the sixth aspect.

According to a fifteenth aspect, this application further provides a chip system, including a processor, configured to perform the methods according to the first aspect to the sixth aspect or the embodiments of the first aspect to the sixth aspect.

According to a sixteenth aspect, this application further provides a communication system, including the first node configured to perform any one of the first aspect or the embodiments of the first aspect, and the IAB donor node configured to perform any one of the second aspect or the embodiments of the second aspect.

According to a seventeenth aspect, this application further provides a communication system, including the first node configured to perform any one of the fourth aspect or the embodiments of the fourth aspect, and the IAB donor node configured to perform any one of the fifth aspect or the embodiments of the fifth aspect.

According to an eighteenth aspect, this application further provides a communication method, including:

A first node receives a first message from a second node, where the first message includes first indication information, the first message is not security protected, and both the first node and the second node are integrated access and backhaul IAB nodes.

The first node sends a second message to an IAB donor node, where the second message is used to indicate that the first node receives the first indication information, and the second message is security protected.

The IAB donor node determines whether the first indication information is trustworthy.

The IAB donor node sends a third message to the first node, where the third message includes second indication information, the second indication information is used to indicate whether the first indication information is trustworthy, and the third message is security protected.

The first node receives the third message from the IAB donor node.

According to a nineteenth aspect, this application further provides a communication method, including:

An IAB donor node determines a first derivation parameter, where the first derivation parameter includes one or more of the following: a cell radio network temporary identifier C-RNTI of a first node, a distributed unit DU identifier of a second node, and a DU name of the second node, the first node is an IAB node, the second node is an IAB node, the second node is connected to the first node, and the first node accesses the IAB donor node through the second node.

The IAB donor node sends the first derivation parameter to the first node, where the first derivation parameter is used to derive a shared key between the first node and the second node, and the shared key is used to encrypt information transmitted between the first node and the second node.

The first node receives the first derivation parameter from the IAB donor node.

The first node derives the shared key between the first node and the second node based on a root key and the first derivation parameter.

DESCRIPTION OF EMBODIMENTS

To make objectives, technical solutions, and advantages of this application more clearly, the following further describes this application in detail with reference to the accompanying drawings. A operation method in a method embodiment further is applied to an apparatus embodiment or a system embodiment. In descriptions of this application, unless otherwise specified, "a plurality of" means two or more.

Figure 1A:
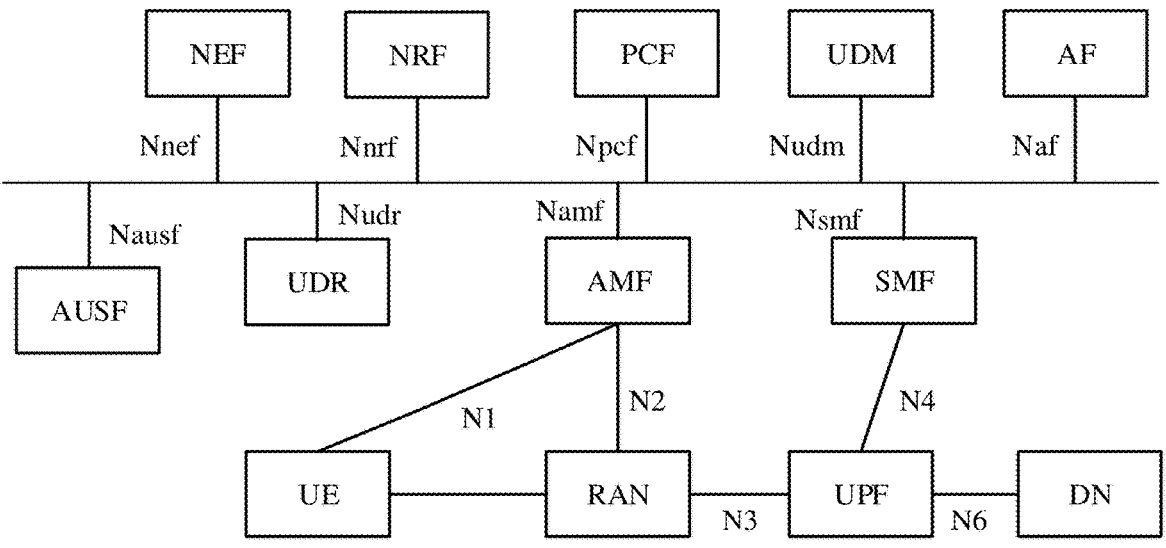
FIG. 1A is a schematic diagram of a 5G network architecture based on a service-based architecture.

FIG. 1A is a schematic diagram of a 5G network architecture based on a service-based architecture. The 5G network architecture shown in FIG. 1A includes three parts: a terminal device, a data network (data network, DN), and a carrier network. The following briefly describes functions of some network elements.

The carrier network includes one or more of the following network elements: an authentication server function (Authentication Server Function, AUSF) network element, a network exposure function (network exposure function, NEF) network element, a policy control function (policy control function, PCF) network element, a unified data management (unified data management, UDM) network element, a unified data repository (Unified Data Repository, UDR) network element, a network repository function (Network Repository Function, NRF) network element, an application function (application function, AF) network element, an access and mobility management function (access and mobility management function, AMF) network element, a session management function (session management function, SMF) network element, a radio access network (radio access network, RAN), a user plane function (user plane function, UPF) network element, and the like. In the foregoing carrier network, a part other than the radio access network is referred to as a core network part.

The terminal device (terminal device) is a device having a wireless transceiver function. The terminal device is deployed on land, and includes an indoor device, an outdoor device, a handheld device, or a vehicle-mounted device; or is deployed on a water surface (for example, on a ship); or is deployed in the air (for example, on an airplane, a balloon, or a satellite). The terminal device is a mobile phone (mobile phone), a tablet (pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), user equipment (user equipment, UE), or the like.

The terminal device establishes a connection to the carrier network through an interface (for example, N1) provided by the carrier network, and use services such as a data service and/or a voice service provided by the carrier network. The terminal device further accesses the DN through the carrier network, and use a carrier service deployed on the DN and/or a service provided by a third party. The third party is a service provider other than the carrier network and the terminal device, and provides services such as a data service and/or a voice service for the terminal device. A representation form of the third party is specifically determined based on an actual application scenario, and is not limited herein.

The RAN is a sub-network of the carrier network, and is an implementation system between a service node in the carrier network and the terminal device. To access the carrier network, the terminal device first passes through the RAN, and is connected to the service node of the carrier network through the RAN. A RAN device is a device that provides a wireless communication function for the terminal device, and the RAN device is further referred to as an access network device. The RAN device includes but is not limited to: a next generation NodeB (gNodeB, gNB), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseBand unit, BBU), a transmission reception point (transmission reception point, TRP), a transmission point (transmission point, TP), a mobile switching center, and the like in 5G.

The AMF network element mainly performs functions such as mobility management, and access authentication/authorization. In addition, the AMF network element is further responsible for transferring a user policy between UE and a PCF.

The SMF network element mainly performs functions such as session management, execution of a control policy delivered by a PCF, UPF selection, and UE internet protocol (internet protocol, IP) address assignment.

The UPF network element serves as an interface UPF of the data network, and implements functions such as user plane data forwarding, session/flow-based charging statistics, and bandwidth throttling.

The UDM network element is mainly responsible for functions such as subscription data management and user access authorization.

The UDR is mainly responsible for a function of accessing data of types such as subscription data, policy data, and application data.

The NEF network element is mainly configured to support capability and event exposure.

The AF network element mainly transfers a parameter of an application side on a network side, for example, a quality of service (Quality of Service, QoS) parameter or user status event subscription. The AF is a third-party functional entity, or is an application service deployed by a carrier, for example, an IP multimedia subsystem (IP Multimedia Subsystem, IMS) voice call service.

The PCF network element is mainly responsible for policy control functions such as session-level or service flow-level charging, QoS bandwidth guarantee and mobility management, and UE policy decision. In this architecture, the PCFs connected to the AMF and the SMF are separately an AM PCF (PCF for Access and Mobility Control) and an SM PCF (PCF for Session Management). In an actual deployment scenario, the PCFs are unable to be a same PCF entity.

The NRF network element is configured to provide a network element discovery function, and provide network element information corresponding to a network element type based on a request from another network element. The NRF further provides a network element management service, for example, registration, update, and deregistration of a network element, and network element status subscription and push.

The AUSF network element is mainly responsible for authenticating a user, to determine whether to allow the user or a device to access a network.

The DN is a network outside the carrier network. The carrier network is connected to a plurality of DNs, and a plurality of services are deployed on the DN, to provide services such as a data service and/or a voice service for the terminal device. For example, the DN is a private network of a smart factory, a sensor installed in a workshop of the smart factory is a terminal device, a control server of the sensor is deployed on the DN, and the control server serves the sensor. The sensor communicates with the control server, to obtain instructions of the control server, transfer collected sensor data to the control server according to the instructions, and the like. For another example, the DN is an internal office network of a company, a mobile phone or a computer of an employee of the company is a terminal device, and the mobile phone or the computer of the employee accesses information, data resources, and the like on the internal office network of the company.

In FIG. 1A, Nausf, Nnef, Npcf, Nudm, Naf, Namf, Nsmf, N1, N2, N3, N4, and N6 are interface sequence numbers. For meanings of the interface sequence numbers, refer to meanings set forth in the 3GPP standard protocol. This is not limited herein.

Figure 1B:
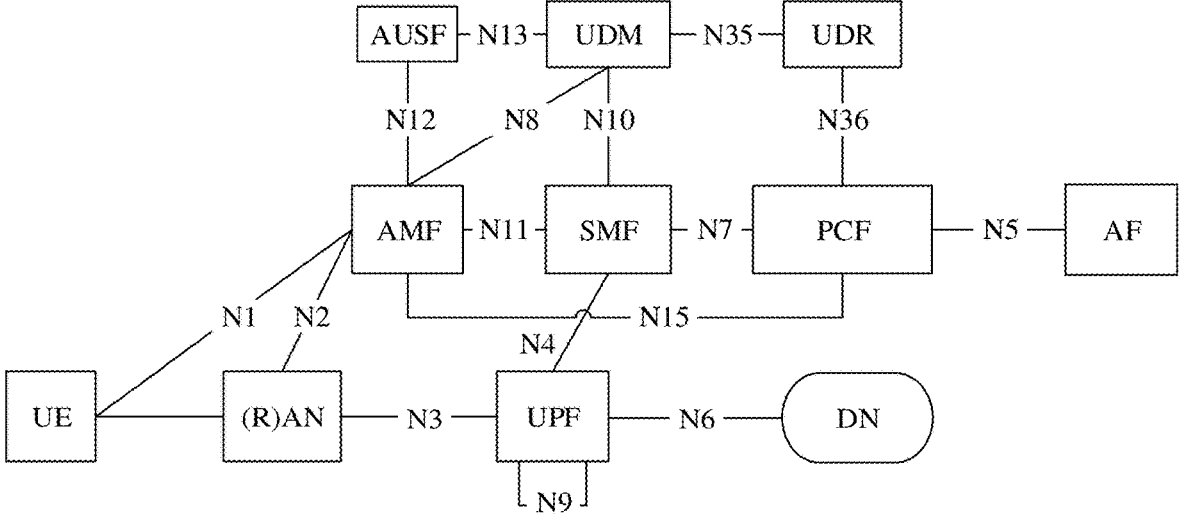
FIG. 1B is a schematic diagram of a 5G network architecture based on a point-to-point interface.

FIG. 1B is a schematic diagram of a 5G network architecture based on a point-to-point interface. For descriptions of functions of network elements in FIG. 1B, refer to descriptions of functions of corresponding network elements in FIG. 1A. Details are not described again. A main difference between FIG. 1B and FIG. 1A lies in that interfaces between network elements in FIG. 1B are point-to-point interfaces rather than service-based interfaces.

In the architecture shown in FIG. 1B, names and functions of the interfaces between the network elements are as follows:

(1) N7 represents an interface between a PCF and an SMF, and is configured to deliver a protocol data unit (protocol data unit, PDU) session granularity control policy and a service data flow granularity control policy.

(2) N15 represents an interface between the PCF and an AMF, and is configured to deliver a UE policy and an access control related policy.

(3) N5 represents an interface between an AF and the PCF, and is configured to deliver an application service request and report a network event.

(4) N4 represents an interface between the SMF and a UPF, and is configured to transfer information between a control plane and a user plane, including delivery of forwarding rules, Qos control rules, traffic statistics rules, and the like from the control plane to the user plane, and reporting of user plane information.

(5) N11 represents an interface between the SMF and the AMF, and is configured to: transfer PDU session tunnel information between a RAN and the UPF, transfer a control message to be sent to UE, transfer radio resource control information to be sent to the RAN, and the like.

(6) N2 represents an interface between the AMF and the RAN, and is configured to transfer radio bearer control information and the like from a core network side to the RAN.

(7) N1 represents an interface between the AMF and the UE, and is configured to transfer a QoS control rule and the like to the UE.

(8) N8 represents an interface between the AMF and a UDM, and is used by the AMF to obtain, from the UDM, subscription data and authentication data related to access and mobility management, and used by the AMF to register current mobility management related information of the UE with the UDM.

(9) N10 represents an interface between the SMF and the UDM, and is used by the SMF to obtain, from the UDM, subscription data related to session management, and used by the SMF to register current session related information of the UE with the UDM.

(10) N35 represents an interface between the UDM and a UDR, and is used by the UDM to obtain user subscription data information from the UDR.

(11) N36 represents an interface between the PCF and the UDR, and is used by the PCF to obtain policy related subscription data and application data related information from the UDR.

(12) N12 represents an interface between the AMF and an AUSF, and is used by the AMF to initiate an authentication procedure to the AUSF, where SUCI is carried as a subscription identifier.

(13) N13 represents an interface between the UDM and the AUSF, and is used by the AUSF to obtain a user authentication vector from the UDM, to perform an authentication procedure.

Figure 2:
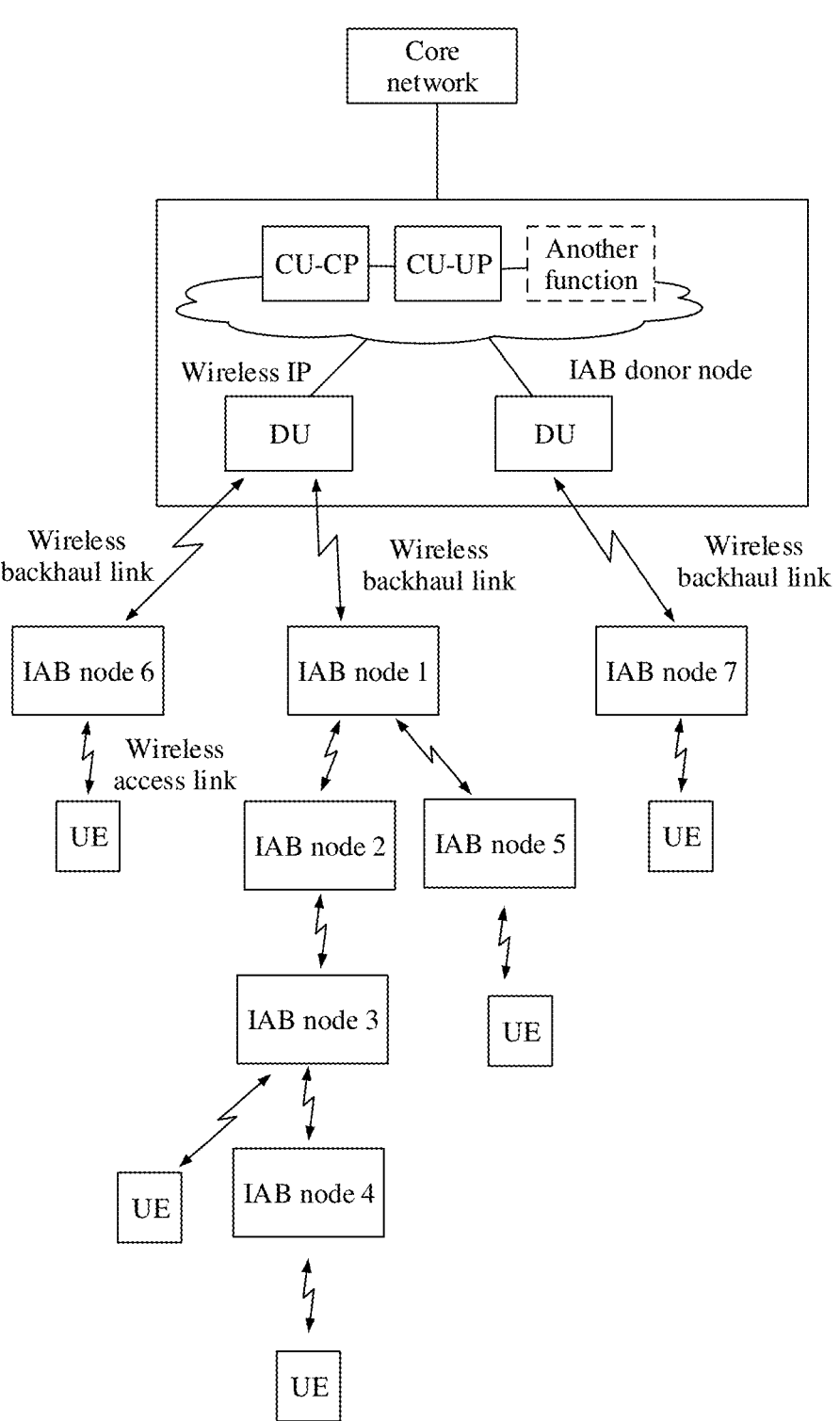
FIG. 2 is a schematic diagram of an IAB architecture.

To reduce construction burden of a wired transmission network and provide flexible and dense NR deployment, an IAB technology is proposed in 5G NR. FIG. 2 is a schematic diagram of an IAB architecture. A quantity of IAB nodes and a connection relationship between the IAB nodes shown in the figure are merely examples, and embodiments of this application are not limited to the examples.

The IAB architecture includes two types of nodes, which are respectively an IAB donor (IAB-donor) node and an IAB node (IAB-node). The IAB donor node is a node of an access type. An effect and a function of the IAB donor node are similar to those of a conventional base station. The IAB donor node provides a UE interface to a core network (CN) (refer to the core network part shown in FIG. 1A or FIG. 1B), and supports a wireless backhaul function of the IAB node. The IAB donor node includes a centralized unit (centralized unit, CU) (further referred to as an IAB donor node-CU or IAB-donor-CU), a distributed unit (distributed unit, DU) (further referred to as an IAB donor node-DU or IAB-donor-DU), and another function, where the IAB node-CU further includes a user plane (user plane, UP) and a control plane (control plane, CP). The IAB node is further a node of an access type, and supports wireless access of UE and wireless backhaul of data. The IAB node includes a mobile terminal (Mobile Terminal, MT) and a DU. The MT has a mobile terminal function in the IAB node. The MT communicates with the IAB donor node or another IAB node through an NR Uu interface, to help the IAB node perform network access authentication and establish communication security.

In an IAB architecture, in two connected IAB nodes, an IAB node close to an IAB donor node is referred to as a parent node, and an IAB node far away from the IAB donor node is referred to as a child node. For example, in FIG. 2, an IAB node 1 is a parent node of an IAB node 2, and the IAB node 2 is a child node of the IAB node 1. For another example, the IAB node 2 is a parent node of an IAB node 3, and the IAB node 3 is a child node of the IAB node 2.

A link between the IAB donor node and the IAB node and a link between two IAB nodes are referred to as wireless backhaul links, and a link between the IAB node and the UE is referred to as a wireless access link. A connection relationship between the IAB node and the IAB donor node is referred to as topology information.

The IAB node and the IAB donor node communicates with each other through an F1 interface. Two different IAB nodes communicate with each other through the Uu interface. The IAB donor node is connected to the core network through the NG interface. In a 5G network or another future network, the foregoing interfaces, such as the F1 interface and the Uu interface, are configured to have other names. This is not limited in embodiments of this application.

The UE in the IAB architecture includes a universal integrated circuit card (Universal Integrated Circuit Card, UICC), mobile equipment (Mobile Equipment, ME), and the like. The UICC is mainly configured to store information such as user information, authentication keys, SMS messages, and payment manners. A logical module in the UICC is a subscriber identity module (Subscriber Identity Module, SIM) card, for example, is a physical SIM card. After the SIM card is inserted into the mobile equipment, the mobile equipment completes services such as registration, service requests, and session establishment with the core network.

The ME performs functions such as sending, receiving, and processing messages. Except that a long term key is stored in the SIM card, another key in a security context is derived and calculated in the ME. When performing bidirectional authentication with a core network element (for example, an AMF or an AUSF), the UE uses the long term key and a related function to verify authenticity of the network.

Figure 3:
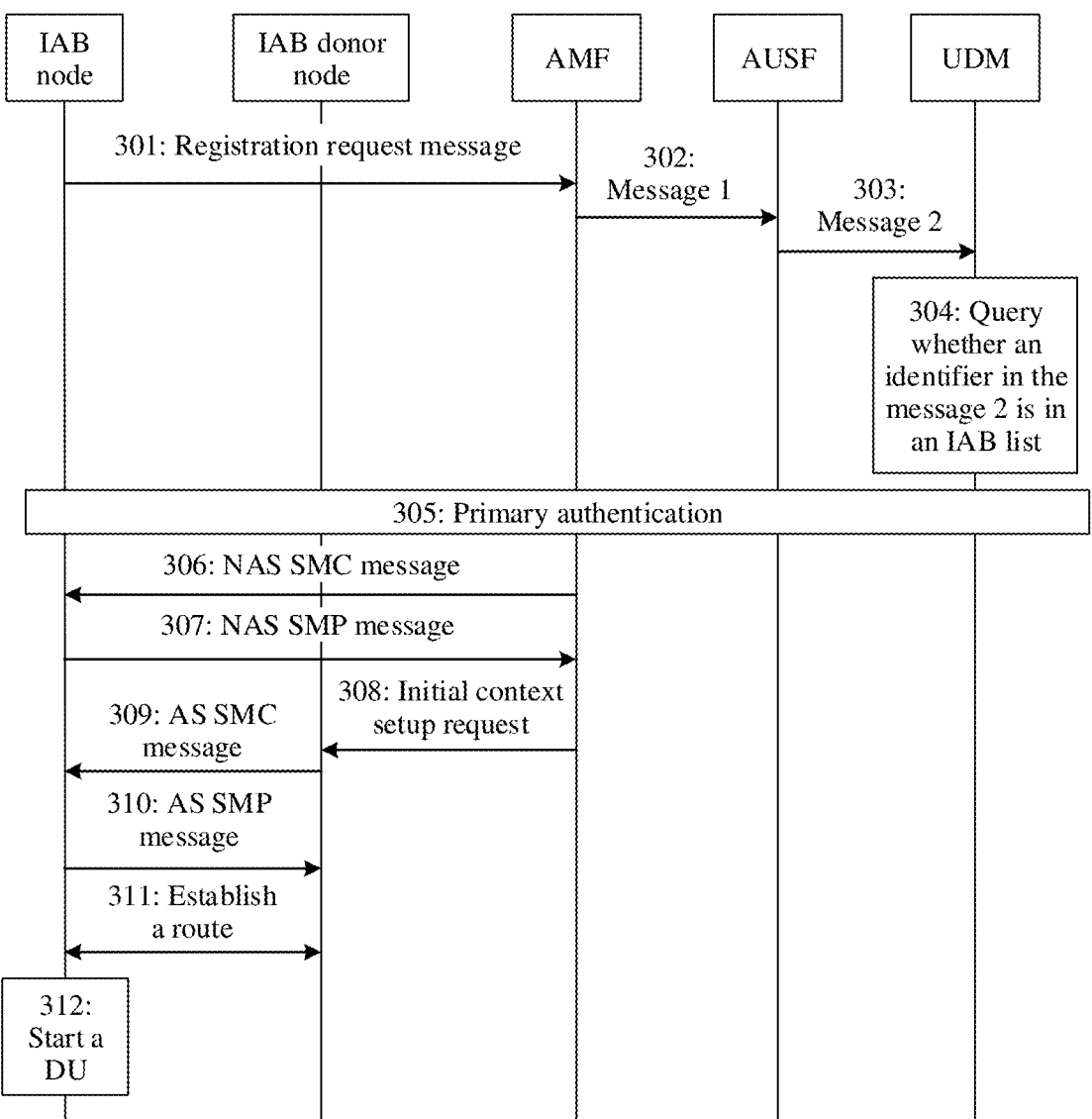
FIG. 3 is a schematic flowchart of starting an IAB node.

The following briefly describes a procedure of starting an IAB node in a conventional technology. As shown in FIG. 3, the procedure of starting an IAB node includes the following steps.

Step 301: An IAB node sends a registration request message to an AMF.

The registration request message includes identity information of the IAB node, for example, a subscription concealed identifier (Subscription Concealed Identifier, SUCI) or a 5G-globally unique temporary identity (Globally Unique Temporary Identity, GUTI).

The AMF is integrated with a security anchor function (security anchor function, SEAF).

Step 302: The AMF sends a message 1 to an AUSF.

The message 1 includes the SUCI/a SUPI and a serving network name (serving network name, SN name).

For example, the message 1 is Nausf_UEAuthentication_Authenticate Request.

Step 303: The AUSF sends a message 2 to a UDM.

The UDM is integrated with an authentication credential repository and processing function (authentication credential repository and processing function, ARPF).

The message 2 includes the SUCI/SUPI and the SN name.

For example, the message 2 is Nudm_UEAuthentication_Get Request.

Step 304: The UDM queries whether the identifier in the message 2 is in an IAB list.

The IAB list is used to record an identifier of one or more IAB nodes.

The identifier in the message 2 is the SUCI/SUPI.

When the identifier in the message 2 is in the IAB list, the UDM determines that a communication device accessing a network is an IAB node. Otherwise, the UDM determines that a communication device accessing the network is common UE.

Step 305: The IAB node performs authentication with a network side.

Step 306: The AMF sends a non-access stratum (non-access stratum, NAS) security mode command (security mode command, SMC) message to the IAB node.

Step 307: The IAB node sends a NAS security mode complete (security mode complete, SMP) message to the AMF.

A NAS security context is set up between the AMF and the IAB node based on step 306 and step 307.

Step 308: The AMF sends an initial context setup request (initial context setup request) to an IAB donor node.

The initial context setup request includes IAB authorized (authorized). The IAB authorized is sent by the UDM to the AMF.

Step 309: The IAB donor node sends an access stratum (access stratum, AS) SMC message to the IAB node.

Step 310: The IAB node sends an AS SMP message to the IAB donor node.

An AS security context is set up between the IAB donor node and the IAB node based on step 309 and step 310.

Step 311: The IAB node establishes a route to the IAB donor node.

For example, a security tunnel is established between the IAB node and the IAB donor node.

Step 312: The IAB node starts a DU.

After the DU of the IAB node is started, the IAB node provides a transmission service for UE or another IAB node.

The procedure of starting an IAB node is briefly introduced above. The procedure of starting an IAB node further includes another step. This is not limited in embodiments of this application.

Because data is exchanged between the IAB donor node and the IAB node through a wireless backhaul link, no cable needs to be laid between the IAB donor node and the IAB node. This makes deployment of the IAB node more flexible. For the UE, the IAB node provides an access service as a base station. For the IAB donor node, the IAB node is an extended DU. Therefore, the IAB node functions as a bridge to extend signal coverage.

Figure 4:
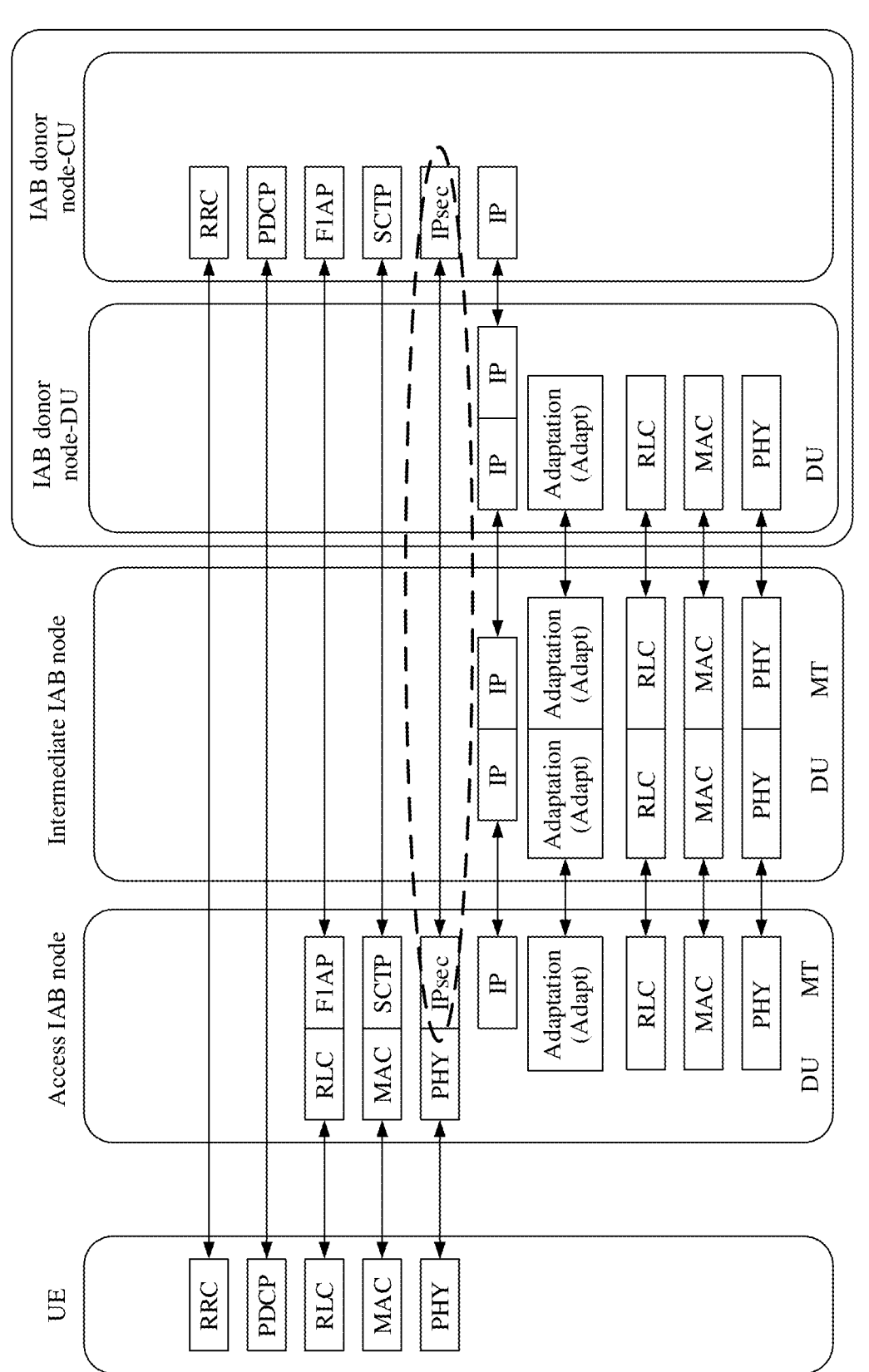
FIG. 4 is a schematic diagram of protocol stacks of related nodes in an IAB architecture.

The following describes protocol stacks of related nodes in an IAB architecture. FIG. 4 is a schematic diagram of protocol stacks of related nodes in an IAB architecture. For example, a security tunnel between an IAB node and an IAB donor node is an internet protocol security (internet protocol security, IPsec) tunnel or a tunnel of another type. This is not limited in embodiments of this application.

In the IAB architecture, a process in which UE receives/sends data on a user plane involves the following nodes: the UE, an access (access) IAB node, an intermediate (intermediate) IAB node, the IAB donor node, and a UPF.

The access IAB node is an IAB node configured to provide an access service for the UE. The intermediate IAB node is an IAB node that provides a wireless backhaul function. The intermediate IAB node is optional.

As shown in FIG. 4, a protocol stack of the UE includes: a radio resource control (Radio Resource Control, RRC) layer, a packet data convergence protocol (Packet Data Convergence Protocol, PDCP) layer, a radio link control (radio link control, RLC) layer, a media access control (media access control, MAC) layer, and a physical layer (PHY layer).

A protocol stack of a DU of the access IAB node includes an RLC layer, a MAC layer, and a PHY layer. A protocol stack of an MT of the access IAB node includes: an F1 application protocol (F1 application protocol, F1AP) layer, a stream control transmission protocol (Stream Control Transmission Protocol, SCTP) layer, an IPsec layer, an IP layer, an adaptation (Adapt) layer, an RLC layer, a MAC layer, and a PHY layer. The adaptation layer is further referred to as a backhaul adaptation protocol (Backhaul Adaptation Protocol, BAP) layer.

A protocol stack of a DU of the intermediate IAB node includes an IP layer, an Adapt layer, an RLC layer, a MAC layer, and a PHY layer. A protocol stack of an MT of the intermediate IAB node includes an IP layer, an Adapt layer, an RLC layer, a MAC layer, and a PHY layer.

A protocol stack of a DU of the IAB donor node includes an IP layer, an Adapt layer, an RLC layer, a MAC layer, and a PHY layer. A protocol stack of a CU of the IAB donor node includes an RRC layer, a PDCP layer, an F1AP layer, an SCTP layer, an IPsec layer, and an IP layer.

An interface between the IAB node and the IAB donor node is referred to as an F1 interface, and communication payload between the IAB node and the IAB donor node is processed at the F1AP layers. Therefore, in embodiments of this application, messages of the communication payload between the IAB node and the IAB donor node at the F1AP layers are further collectively referred to as F1 messages.

For functions of the foregoing layers, refer to descriptions in a conventional technology. Details are not described herein.

In embodiments of this application, when an IAB node is directly connected to an IAB donor node, the IAB node communicates with the IAB donor node through a wireless backhaul link between the IAB node and the IAB donor node. For example, refer to FIG. 2. The IAB node 1 receives an F1 message from the IAB donor node; or the IAB node 1 sends an F1 message to the IAB donor node.

When an IAB node is not directly connected to an IAB donor node, the IAB node communicates with the IAB donor node through another IAB node between the IAB node and the IAB donor node. For example, refer to FIG. 2. When the IAB donor node needs to send an F1 message to the IAB node 3, the IAB donor node forwards the F1 message through the IAB node 1 and the IAB node 2; in other words, the F1 message sent by the IAB donor node reaches the IAB node 3 through forwarding by the IAB node 1 and the IAB node 2. Alternatively, when the IAB node 3 needs to send an F1 message to the IAB donor node, the IAB node 3 forwards the F1 message through the IAB node 2 and the IAB node 1; in other words, the F1 message sent by the IAB node 3 reaches the IAB donor node through forwarding by the IAB node 2 and the IAB node 1.

Refer to FIG. 4. The IPsec tunnel is established at the IPsec layers between the IAB node and the IAB donor node, to securely transmit data. In other words, a message transmitted between the IAB node and the IAB donor node through F1AP layers is under IPsec security protection, namely, integrity and encryption protection. Therefore, communication between the IAB node and the IAB donor node is secure and reliable, and a security-protected part in a transmitted message is not tampered with or parsed by an attacker. In other words, the F1 message is security protected.

A message is transferred between the two IAB nodes through IP layers, Adapt layers, RLC layers, MAC layers, and PHY layers. Because no security tunnel (for example, IPsec tunnel) is established for the corresponding IP layers, the Adapt layers, the RLC layers, the MAC layers, and the PHY layers, communication performed between the two IAB nodes is unreliable, and a transmitted message is subject to a security attack (for example, data carried in the message is intercepted and tampered with), that is, the message transmitted between the two IAB nodes is not security protected.

The foregoing descriptions that the message transferred between the two IAB nodes are unreliable. When one IAB node receives a message sent by another IAB node, the IAB node is unable to determine whether information carried in the message is trustworthy, for example, whether the information is tampered with by an attacker. As a result, communication quality is affected.

To resolve the foregoing problem, embodiments of this application provide a plurality of different methods, which are separately described below.

Figure 5A:
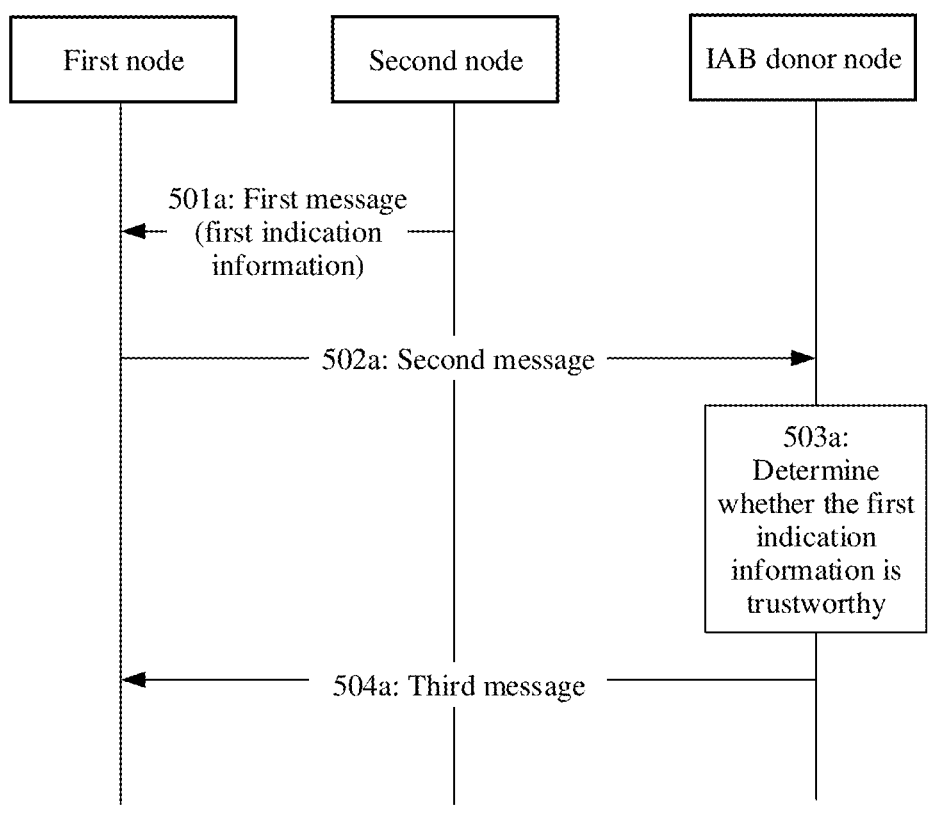
FIG. 5A is a schematic flowchart of a communication method according to this application.

FIG. 5A shows a communication method according to an embodiment of this application. On an IAB node side, the method is performed by an IAB node or a component (for example, a chip or a circuit) used in the IAB node. On an IAB donor node side, the method is performed by an IAB donor node or a component (for example, a chip or a circuit) used in the IAB donor node. For ease of description, an example in which the IAB node and the IAB donor node perform the method is used below for description.

The method includes the following steps.

Step 501*a*: A second node sends a first message to a first node. Correspondingly, the first node receives the first message.

Both the first node and the second node are IAB nodes.

The first message includes first indication information, and the first message is not security protected, for example, is not under the IPsec security protection described above or other security protection. Therefore, whether the first indication information carried in the first message is trustworthy needs to be determined.

The first message is an IP layer message, an Adapt layer message (further referred to as a BAP layer message), an RLC layer message, a MAC layer message, or a PHY layer message.

Step 502*a*: The first node sends a second message to the IAB donor node. Correspondingly, the IAB donor node receives the second message.

The first node is an IAB node directly connected to the IAB donor node, or is an IAB node that is not directly connected to the IAB donor node. FIG. 2 is used as an example. For example, the second node is the IAB node 1, and the first node is the IAB node 2 or an IAB node 5. For another example, the second node is the IAB node 2, and the first node is the IAB node 1 or the IAB node 3. For another example, the second node is the IAB node 3, and the first node is the IAB node 2 or an IAB node 4.

When the first node is directly connected to the IAB donor node, the first node sends the second message to the IAB donor node through a wireless backhaul link between the first node and the IAB donor node. When the first node is not directly connected to the IAB donor node, the first node sends the second message to the IAB donor node through another IAB node between the first node and the IAB donor node. For example, when the first node is the IAB node 2, the IAB node 2 sends the second message to the IAB donor node through the IAB node 1. In this case, the IAB node 1 transparently transmits the second message.

The second message is used to indicate that the first node receives the first indication information. The second message is security protected. For example, the second message is under the IPsec security protection described above or other security protection. The second message is an F1 message.

An implementation method in which the second message is used to indicate that the first node receives the first indication information includes but is not limited to the following:

Method 1: The second message is a special message, for example, a special F1 message. The IAB donor node identifies that the second message is used to indicate that the first node receives the first indication information. That is, a name of the second message is used to indicate that the first node receives the first indication information.

Method 2: The second message includes third indication information, and the third indication information is used to indicate that the first node receives the first indication information.

Step 503*a*: The IAB donor node determines whether the first indication information is trustworthy.

A method for determining, by the IAB donor node, whether the first indication information is trustworthy is not limited in embodiments of this application, and different methods are used with reference to different application scenarios. For example, if the first indication information is used to indicate that an IAB node in an IAB network topology is congested, the IAB donor node comprehensively determines, based on information reported by another IAB node, whether the IAB node indicated by the first indication information is actually congested, to determine whether the first indication information is trustworthy. For another example, if the first indication information is used to indicate that signal transmission between an IAB node in an IAB network topology and a child IAB node of the IAB node is interrupted, the IAB donor node comprehensively determines, based on information reported by another IAB node, whether the signal transmission between the two IAB nodes indicated by the first indication information is actually interrupted, to determine whether the first indication information is trustworthy.

Step 504*a*: The IAB donor node sends a third message to the first node. Correspondingly, the first node receives the third message.

When the first node is directly connected to the IAB donor node, the IAB donor node sends the third message to the first node through the wireless backhaul link between the first node and the IAB donor node. When the first node is not directly connected to the IAB donor node, the IAB donor node sends the third message to the first node through another IAB node between the first node and the IAB donor node. For example, when the first node is the IAB node 2, the IAB donor node sends the third message to the IAB node 2 through the IAB node 1. In this case, the IAB node 1 transparently transmits the third message.

The third message includes second indication information, and the second indication information is used to indicate whether the first indication information is trustworthy. The third message is security protected. For example, the third message is under the IPsec security protection described above or other security protection. The third message is an F1 message.

For example, if the IAB donor node determines that the first indication information is trustworthy in step 503*a*, the second indication information is used to indicate that the first indication information is trustworthy. For another example, if the IAB donor node determines that the first indication information is untrustworthy in step 503*a*, the second indication information is used to indicate that the first indication information is untrustworthy. For example, the second indication information is 1-bit information, where "0" is used to indicate that the first indication information is untrustworthy, and "1" is used to indicate that the first indication information is trustworthy; or "0" is used to indicate that the first indication information is trustworthy, and "1" is used to indicate that the first indication information is untrustworthy.

In the foregoing solution, after the second node sends the first indication information to the first node by using the message that is not security protected, the first node requests the IAB donor node to verify whether the first indication information is trustworthy, so that the first node performs a subsequent operation based on a verification result of the IAB donor node. For example, when determining that the first indication information is trustworthy, the first node performs a corresponding operation based on the first indication information; otherwise, the first node does not perform a corresponding operation. This eliminates a security risk in a communication process, and help improve communication quality.

The following describes the embodiment shown in FIG. 5A by using an example in which a signal transmission exception (for example, signal transmission interruption, child node congestion, child node transmission module failure, parent node congestion, or parent node transmission module failure) occurs between a parent node and a child node. When signal transmission occurs between the parent node and the child node, both the parent node and the child node check a current signal transmission status. If discovering a signal transmission exception, the parent node and the child node separately send indication information to other IAB nodes connected to the parent node and the child node, where the indication information is used to indicate that the signal transmission exception occurs on the IAB node.

The following uses an example in which a signal transmission exception occurs between the IAB node 2 (a parent node) and the IAB node 3 (a child node) in FIG. 2 for description.

Figure 5B:
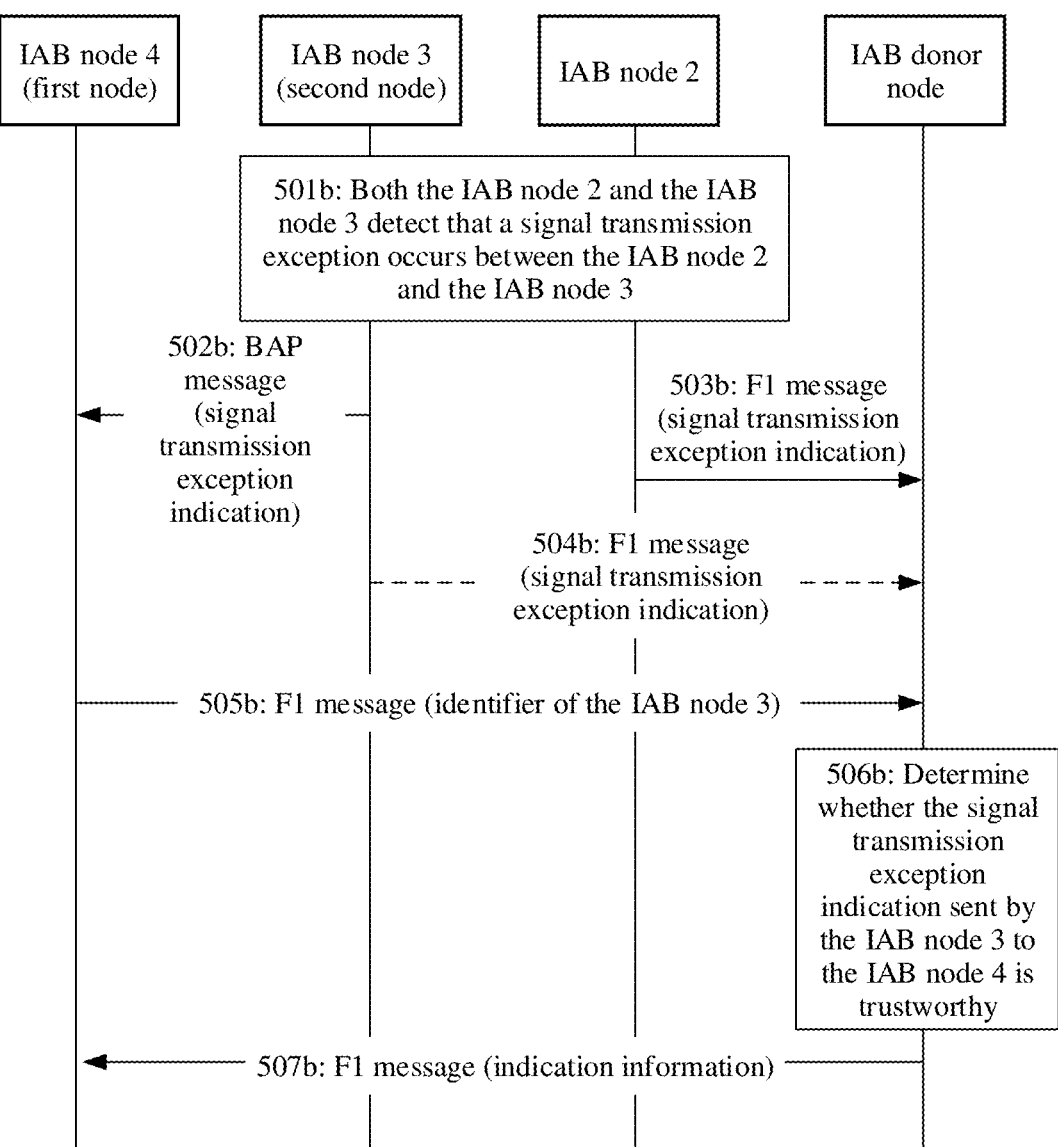
FIG. 5B is a schematic flowchart of another communication method according to this application.

FIG. 5B is a schematic flowchart of another communication method according to this application. The method includes the following steps.

Step 501b: Both the IAB node 2 and the IAB node 3 detect that a signal transmission exception occurs between the IAB node 2 and the IAB node 3.

Step 502b: The IAB node 3 sends a BAP message to the IAB node 4, where the BAP message includes a signal transmission exception indication.

The signal transmission exception indication herein is an example of the first indication information in the embodiment corresponding to FIG. 5A, and the signal transmission exception indication is used to indicate that the signal transmission exception occurs on the IAB node 3.

The BAP message is the first message in the embodiment corresponding to FIG. 5A, and is not security protected.

Step 503b: The IAB node 2 sends an F1 message to an IAB donor node.

The F1 message includes a signal transmission exception indication, where the signal transmission exception indication is used to indicate that the signal transmission exception occurs on the IAB node 2. Optionally, the F1 message includes an identifier of the IAB node 2. The identifier of the IAB node 2 is, for example, a BAP address (BAP address) of the IAB node 2, or an identifier (BAP path ID) of a BAP path between the IAB node 2 and the IAB node 3.

The F1 message is security protected.

Step 504b: The IAB node 3 sends an F1 message to the IAB donor node.

Step 504b is an optional step. For example, when the identifier of the BAP path between the IAB node 2 and the IAB node 3 is carried in step 503b, step 504b is unable to be performed.

The F1 message includes the signal transmission exception indication, where the signal transmission exception indication is used to indicate that the signal transmission exception occurs on the IAB node 3. Optionally, the F1 message includes an identifier of the IAB node 3. The identifier of the IAB node 3 is, for example, a BAP address of the IAB node 3, or the identifier of the BAP path between the IAB node 2 and the IAB node 3.

The F1 message is security protected.

The IAB donor node determines, by using the F1 message in step 503b and/or the F1 message in step 504b, that a signal transmission exception occurs between the IAB node 2 and the IAB node 3.

An execution sequence of step 502b, step 503b, and step 504b is not limited in embodiments of this application.

Optionally, after receiving the signal transmission exception indication, the IAB node 4 interrupts uplink data transmission, and performs uplink data restoration. The uplink data transmission restoration herein means that, after the signal transmission exception occurs between the IAB node 2 and the IAB node 3, data that is continuously sent by the IAB node 4 to the IAB node 3 but fails to be sent needs to be restored. After a transmission channel is recovered, the IAB node 4 needs to send the restored data to the IAB node 3 again.

Step 505b: The IAB node 4 sends an F1 message to the IAB donor node. Correspondingly, the IAB donor node receives the F1 message.

The F1 message is security protected. The F1 message is the second message in the embodiment corresponding to FIG. 5A.

In an implementation method, the F1 message is a special message, and the F1 message carries the identifier of the IAB node 3 and is used to indicate that the signal transmission exception indication from the IAB node 3 is received. Therefore, after receiving the F1 message, the IAB donor node identifies, based on a name of the F1 message and the carried identifier of the IAB node 3, that the F1 message is used to indicate that the IAB node 3 sends the signal transmission exception indication to the IAB node 4. Further, the IAB donor node determines whether the signal transmission exception actually occurs on the IAB node 3.

In another implementation method, the F1 message alternatively is an existing F1 message, the F1 message carries the identifier of the IAB node 3 and indication information, and the indication information is used to indicate that the signal transmission exception indication from the IAB node 3 is received. Therefore, after receiving the F1 message, the IAB donor node determines, based on the indication information and the identifier of the IAB node 3 that are carried in the F1 message, that the IAB node 3 sends the signal transmission exception indication to the IAB node 4. Further, the IAB donor node determines whether the signal transmission exception actually occurs on the IAB node 3.

The identifier of the IAB node 3 is, for example, the BAP address of the IAB node 3, or the identifier of the BAP path between the IAB node 2 and the IAB node 3.

Optionally, after sending the F1 message to the IAB donor node, the IAB node 4 starts a timer. Before the timer expires, if the IAB node 4 receives an F1 message that is sent by the IAB donor node and that carries indication information (where the indication information is used to indicate that the signal transmission exception indication sent by the IAB node 3 to the IAB node 4 is trustworthy), the IAB node 4 determines that the signal transmission exception occurs on the IAB node 3, that is, the signal transmission exception indication sent by the IAB node 3 to the IAB node 4 is trustworthy. Alternatively, before the timer expires, if the IAB node 4 does not receive an F1 message that is sent by the IAB donor node and that carries indication information (where the indication information is used to indicate that the signal transmission exception indication sent by the IAB node 3 to the IAB node 4 is trustworthy), the IAB node 4 determines that no signal transmission exception occurs on the IAB node 3, that is, the signal transmission exception indication sent by the IAB node 3 to the IAB node 4 is untrustworthy. Alternatively, before the timer expires, if the IAB node 4 receives an F1 message that is sent by the IAB donor node and that carries indication information (where the indication information is used to indicate that the signal transmission exception indication sent by the IAB node 3 to the IAB node 4 is untrustworthy), the IAB node 4 determines that no signal transmission exception occurs on the IAB node 3, that is, the signal transmission exception indication sent by the IAB node 3 to the IAB node 4 is untrustworthy.

Step 506b: The IAB donor node determines whether the signal transmission exception indication sent by the IAB node 3 to the IAB node 4 is trustworthy.

After receiving the F1 message sent by the IAB node 4, the IAB donor node determines that the IAB node 4 receives the signal transmission exception indication sent by the IAB node 3, and further determines whether the signal transmission exception indication is trustworthy. For example, the following methods are used for determining: For example, if the IAB donor node determines, based on the signal transmission exception indication reported by the IAB node 2, that the signal transmission exception occurs between the IAB node 2 and the IAB node 3, the IAB donor node determines that the signal transmission exception indication received by the IAB node 4 from the IAB node 3 is trustworthy. For another example, if the IAB donor node determines, based on the signal transmission exception indications respectively reported by the IAB node 2 and the IAB node 3, that the signal transmission exception occurs between the IAB node 2 and the IAB node 3, the IAB donor node determines that the signal transmission exception indication received by the IAB node 4 from the IAB node 3 is trustworthy. For another example, if the IAB donor node determines that no signal transmission exception occurs between the IAB node 2 and the IAB node 3, the IAB donor node determines that the signal transmission exception indication received by the IAB node 4 from the IAB node 3 is untrustworthy.

Step 507b: The IAB donor node sends an F1 message to the IAB node 4. Correspondingly, the IAB node 4 receives the F1 message.

The F1 message is security protected, and the F1 message is the third message in the embodiment corresponding to FIG. 5A.

The F1 message carries one piece of indication information, and the indication information is used to indicate that the signal transmission exception indication sent by the IAB node 3 to the IAB node 4 is trustworthy, or is used to indicate that a signal transmission exception indication sent by the IAB node 2 to the IAB node 3 is untrustworthy. Specifically, in this embodiment of this application, the signal transmission exception actually occurs between the IAB node 2 and the IAB node 3. Therefore, the indication information is used to indicate that the signal transmission exception indication sent by the IAB node 3 to the IAB node 4 is trustworthy. Therefore, after receiving the F1 message, the IAB node 4 determines, based on the indication information in the F1 message, that the signal transmission exception indication sent by the IAB node 3 to the IAB node 4 is trustworthy, that is, the signal transmission exception actually occurs on the IAB node 3.

In an implementation method, for example, if the IAB donor node determines that the signal transmission exception indication sent by the IAB node 3 to the IAB node 4 is trustworthy, the IAB donor node sends the F1 message to the IAB node 3, where the F1 message or the indication information in the F1 message is used to indicate that the signal transmission exception indication sent by the IAB node 3 to the IAB node 4 is trustworthy. After receiving the F1 message, the IAB node 4 determines, based on the F1 message or the indication information in the F1 message, that the signal transmission exception indication sent by the IAB node 3 to the IAB node 4 is trustworthy, that is, the signal transmission exception occurs on the IAB node 3.

Therefore, the IAB node 4 maintains a state of stopping data sending, and resume data sending after a topology changes. If the timer is set in the IAB node 4 in step 505b, the IAB node 4 needs to receive the F1 message before the timer expires, so as to determine that the signal transmission exception indication sent by the IAB node 3 to the IAB node 4 is trustworthy.

In another implementation method, for example, if the IAB donor node determines that the signal transmission exception indication sent by the IAB node 3 to the IAB node 4 is untrustworthy, the IAB donor node sends the F1 message to the IAB node 4, where the F1 message or the indication information in the F1 message is used to indicate that the signal transmission exception indication sent by the IAB node 3 to the IAB node 4 is untrustworthy. After receiving the F1 message, the IAB node 4 determines, based on the F1 message, that the signal transmission exception indication sent by the IAB node 3 to the IAB node 4 is untrustworthy, that is, no signal transmission exception occurs on the IAB node 3. Therefore, the IAB node 4 resumes data sending. If the timer is set in the IAB node 4 in step 505b, and the IAB node 4 receives the F1 message before the timer expires or does not receive the F1 message before the timer expires, a determination is made that the signal transmission exception indication sent by the IAB node 3 to the IAB node 4 is untrustworthy.

In another alternative implementation solution of step 507b, when the IAB donor node determines that the signal transmission exception indication sent by the IAB node 3 to the IAB node 4 is trustworthy, the IAB donor node sends an F1 message to the IAB node 4, where the F1 message is used to indicate that the signal transmission exception indication sent by the IAB node 3 to the IAB node 4 is trustworthy; or the IAB donor node sends an F1 message to the IAB node 4, where the F1 message carries indication information, and the indication information is used to indicate that the signal transmission exception indication sent by the IAB node 3 to the IAB node 4 is trustworthy. If the timer is set in the IAB node 4 in step 505b, the IAB node 4 needs to receive the F1 message before the timer expires, so as to determine that the signal transmission exception indication sent by the IAB node 3 to the IAB node 4 is trustworthy. When the IAB donor node determines that the signal transmission exception indication sent by the IAB node 3 to the IAB node 4 is untrustworthy, the IAB donor node does not send the F1 message to the IAB node 4.

In the foregoing solution, after receiving the transmission exception indication, the IAB node requests, by using the security-protected F1 message, the IAB donor node to verify whether the received transmission exception indication is trustworthy, and performs a corresponding operation based on a feedback result of the IAB donor node. The method eliminates a security risk in a communication process, and help improve communication quality.

The IAB node 3 and the IAB node 4 in the embodiment corresponding to FIG. 5B are examples of the first node and the second node in the embodiment corresponding to FIG. 5A. The indication information in step 507b in the embodiment corresponding to FIG. 5B is an example of the second indication information in the embodiment corresponding to FIG. 5A.

In this embodiment, the path on which the signal transmission exception occurs between the IAB node 2 and the IAB node 3 further is referred to as a first path, that is, the first path is the path on which the signal transmission exception occurs. The first path includes a third node. In the foregoing example, the third node herein is the IAB node 3.

When the signal transmission exception occurs between the IAB node 2 and the IAB node 3 in FIG. 2, after another IAB node (for example, the IAB node 1) receives a signal transmission exception indication, the another IAB node is configured to use a method similar to that used by the IAB node 4, to request the IAB donor node to verify whether the received signal transmission exception indication is trustworthy. Details are not described again.

Figure 6A:
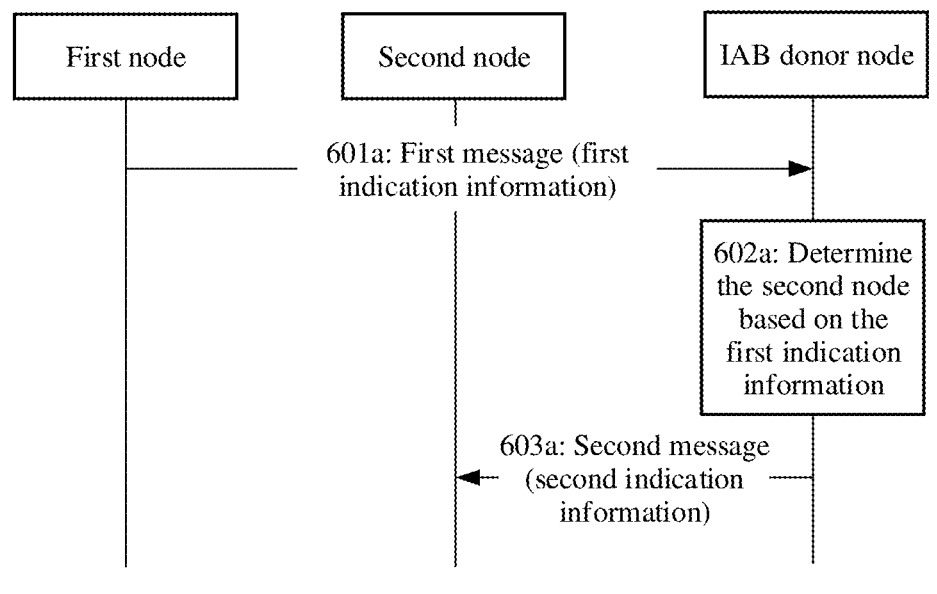
FIG. 6A is a schematic flowchart of another communication method according to this application.

FIG. 6A shows another communication method according to an embodiment of this application. On an IAB node side, the method is performed by an IAB node or a component (for example, a chip or a circuit) used in the IAB node. On an IAB donor node side, the method is performed by an IAB donor node or a component (for example, a chip or a circuit) used in the IAB donor node. For ease of description, an example in which the IAB node and the IAB donor node perform the method is used below for description.

According to the method, the IAB node forwards information to another IAB node through the IAB donor node. This helps avoid a security risk problem existing in direct communication between the IAB nodes, to improve communication quality.

The method includes the following steps.

Step 601a: A first node sends a first message to the IAB donor node. Correspondingly, the IAB donor node receives the first message.

The first node is an IAB node. The first message includes first indication information.

The first message is security protected. For example, the first message is under the IPsec security protection described above or other security protection. The first message is an F1 message.

The first node is an IAB node directly connected to the IAB donor node, or is an IAB node that is not directly connected to the IAB donor node. FIG. 2 is used as an example. For example, the first node is the IAB node 1, the IAB node 2, or the IAB node 5. When the first node is directly connected to the IAB donor node, the first node sends the first message to the IAB donor node through a wireless backhaul link between the first node and the IAB donor node. When the first node is not directly connected to the IAB donor node, the first node sends the first message to the IAB donor node through another IAB node between the first node and the IAB donor node. For example, when the first node is the IAB node 2, the IAB node 2 sends the first message to the IAB donor node through the IAB node 1. In this case, the IAB node 1 transparently transmits the first message.

Step 602a: The IAB donor node determines a second node based on the first indication information, where the second node is an IAB node.

The second node is an IAB node that needs to receive the first indication information. A method for determining the second node by the IAB donor node is not limited in embodiments of this application, and a corresponding method is used with reference to a scenario. In an implementation method, for example, the first message further carries information about a first path, the first path includes the first node, the first path is a path on which a signal transmission exception occurs in a network topology, and the first indication information is used to indicate that the signal transmission exception occurs on the first path. In this case, the IAB donor node determines that a node that is in the network topology and that is affected by the signal transmission exception is the second node. That is, the second node is a node affected by the first path on which the signal transmission exception occurs. For example, if a signal transmission exception (for example, congestion or signal transmission interruption) occurs between the first node and a child node of the first node, the second node is a parent node of the first node, or is a level-2 child node of the first node.

Step 603a: The IAB donor node sends a second message to the second node. Correspondingly, the second node receives the second message.

The second message includes second indication information, and the second indication information is the same as the first indication information, or is generated based on the first indication information.

The second message is security protected. For example, the second message is under the IPsec security protection described above or other security protection. The second message is an F1 message.

In an implementation method, the second message and the first message are a same message, that is, the IAB donor node forwards the first message received from the first node. In this case, the second indication information carried in the second message and the first indication information carried in the first message are same indication information.

In another implementation method, the second message and the first message are different messages, that is, after receiving the first message, the IAB donor node needs to perform corresponding processing to generate the second message. In this case, the second indication information in the second message is the same as or different from the first indication information carried in the first message.

The second node is an IAB node directly connected to the IAB donor node, or is an IAB node that is not directly connected to the IAB donor node. When the second node is directly connected to the IAB donor node, the IAB donor node sends the second message to the second node through a wireless backhaul link between the second node and the IAB donor node. When the second node is not directly connected to the IAB donor node, the IAB donor node sends the second message to the second node through another IAB node between the second node and the IAB donor node.

Based on the foregoing solution, the IAB node sends the first indication information to the IAB donor node by using the security protected first message, then the IAB donor node obtains the second indication information based on the first indication information, and sends the second indication information to the another IAB node by using the security protected second message. In this process, the IAB donor node is used as a bridge for information transmission between the two IAB nodes, so that security protection is performed on information transmitted between the IAB nodes. This eliminates a security risk in a communication process, and help improve communication quality.

The following describes the embodiment shown in FIG. 5A by using an example in which a signal transmission exception (for example, signal transmission interruption, child node congestion, child node transmission module failure, parent node congestion, or parent node transmission module failure) occurs between a parent node and a child node. When signal transmission occurs between the parent node and the child node, both the parent node and the child node check a current information transmission status. If discovering a signal transmission exception, the parent node and the child node separately send indication information to other IAB nodes connected to the parent node and the child node, where the indication information is used to indicate that the signal transmission exception occurs on the IAB node.

The following uses an example in which a signal transmission exception occurs between the IAB node 2 (a parent node) and the IAB node 3 (a child node) in FIG. 2 for description.

Figure 6B:
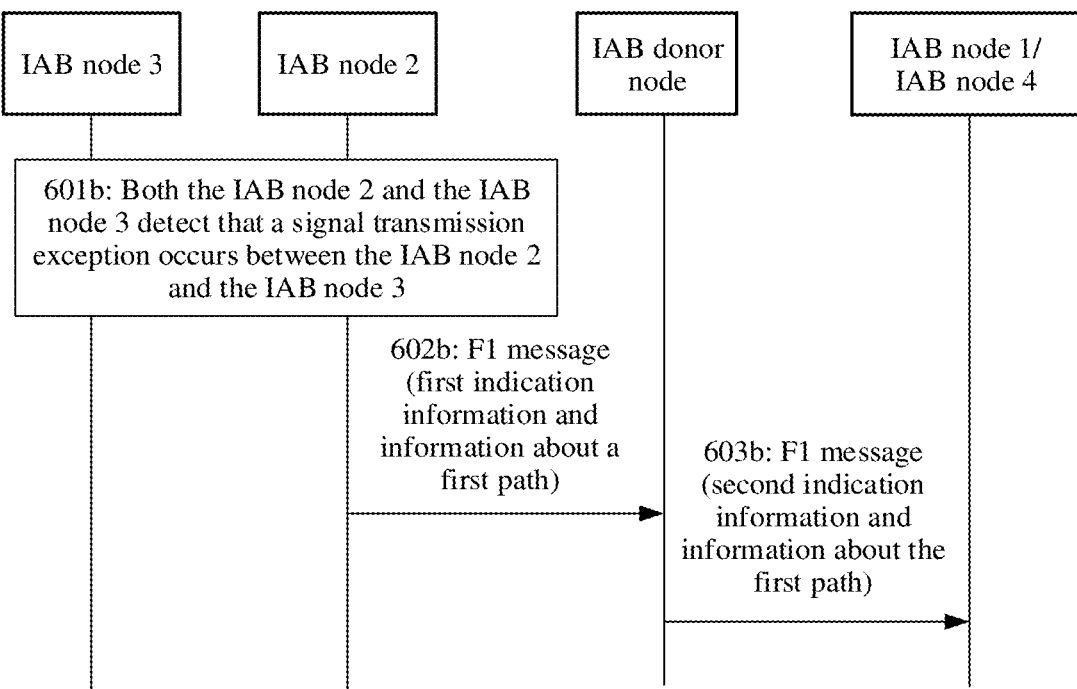
FIG. 6B is a schematic flowchart of another communication method according to this application.

FIG. 6B is a schematic flowchart of another communication method according to this application. The method includes the following steps.

Step 601*b*: Both the IAB node 2 and the IAB node 3 detect that a signal transmission exception occurs between the IAB node 2 and the IAB node 3.

Step 602*b*: The IAB node 2 sends an F1 message to an IAB donor node. Correspondingly, the IAB donor node receives the F1 message.

The IAB node 2 is an example of the first node in the embodiment corresponding to FIG. 6A.

In an implementation method, after detecting that the signal transmission exception occurs, the IAB node 2 immediately sends the F1 message to the IAB donor node. In another implementation method, after detecting that the signal transmission exception occurs, if determining that there is no other alternative path for a path on which the signal transmission exception occurs currently, the IAB node 2 sends the F1 message to the IAB donor node.

For example, a manner in which the IAB node 2 sends the F1 message is: The IAB node 2 determines whether a parent node of the IAB node 2 is the IAB donor node. If the parent node of the IAB node 2 is not the IAB donor node, the IAB node 2 sends a BAP message (where the BAP message carries information about a first path and first indication information, and the first indication information is used to indicate that the signal transmission exception occurs on the first path) to an F1AP layer, an SCTP layer, or an IPsec layer for processing, and after security protection processing is performed by using the F1AP layer, the SCTP layer, or the IPsec layer, the IAB node 2 sends the F1 message to the IAB donor node. If the parent node of the IAB node 2 is the IAB donor node, the IAB node 2 sends the F1 message to the IAB donor node, where the F1 message carries the information about the first path and the indication information. The information about the first path is an identifier (BAP path ID) of a BAP path between the IAB node 2 and the IAB node 3, or a BAP address (BAP address) of the IAB node 2 and a BAP address (BAP address) of the IAB node 3. Optionally, the F1 message further carries an identifier of the parent node (namely, the IAB node 1) of the IAB node 2.

The first path is a path between the IAB node 2 and the IAB node 3.

Step 603*b*: The IAB donor node sends an F1 message to the IAB node 1 and/or the IAB node 4. Correspondingly, the IAB node 1 and/or the IAB node 4 receives the F1 message.

The IAB node 1 and the IAB node 4 are an example of the second node in the embodiment corresponding to FIG. 6A.

After receiving the security protected F1 message from the IAB node 2, the IAB donor node verifies the F1 message. After the verification on the F1 message is successful, the IAB donor node obtains the information about the path on which the signal transmission exception occurs (namely, the information about the path between the IAB node 2 and the IAB node 3, namely, the information about the first path), and determines an object (namely, a node affected by the signal transmission exception) that needs to forward the indication information in the received F1 message. A determining method is as follows: The IAB donor node queries a routing table that currently includes the information about the path on which the signal transmission exception occurs, to search for the node (for example, including the IAB node 1 and the IAB node 4) affected by the signal transmission exception. There is one or more nodes affected by the signal transmission exception, and the nodes includes a first-level parent node or multiple levels of parent nodes of the IAB node 2, and a first-level child node or multiple levels of child nodes of the IAB node 3.

The IAB donor node sends an F1 message to the node (for example, including the IAB node 1 and the IAB node 4) affected by the signal transmission exception. The F1 message carries second indication information and the information about the first path, and the second indication information is used to indicate that the signal transmission exception occurs on the first path. The second indication information is the same as the first indication information, or is generated based on the first indication information.

The second node is an IAB node directly connected to the IAB donor node, or is an IAB node that is not directly connected to the IAB donor node. When the second node is directly connected to the IAB donor node, the IAB donor node sends the F1 message to the second node through a wireless backhaul link between the second node and the IAB donor node. When the second node is not directly connected to the IAB donor node, the IAB donor node sends the F1 message to the second node through another IAB node between the second node and the IAB donor node. In this case, another IAB node transparently transmits the F1 message.

For a child node (for example, the IAB node 4) of the IAB node 3, the IAB donor node verifies whether there is an available path from the IAB donor node to the IAB node 4, and if there is no available path, perform topology adjustment and create an available path. For a topology adjustment method, refer to related descriptions in section 9.7 of 3GPP TR 38.874. Details are not described.

When the signal transmission exception occurs between the IAB node 2 and the IAB node 3, in the foregoing embodiment, the IAB node 2 sends, to the IAB donor node, the F1 message that carries the information about the first path and the first indication information. In another implementation method, alternatively, the IAB node 3 sends the F1 message to the IAB donor node. This is not limited in embodiments of this application.

In the foregoing solution, the information between the IAB nodes is forwarded by using the security-protected F1 message, so that the information between the IAB nodes are security protected. This helps ensure that the message between the IAB nodes is not maliciously used by an attacker, thereby eliminating a security risk in a communication process, and helping improve communication quality.

Figure 7A:
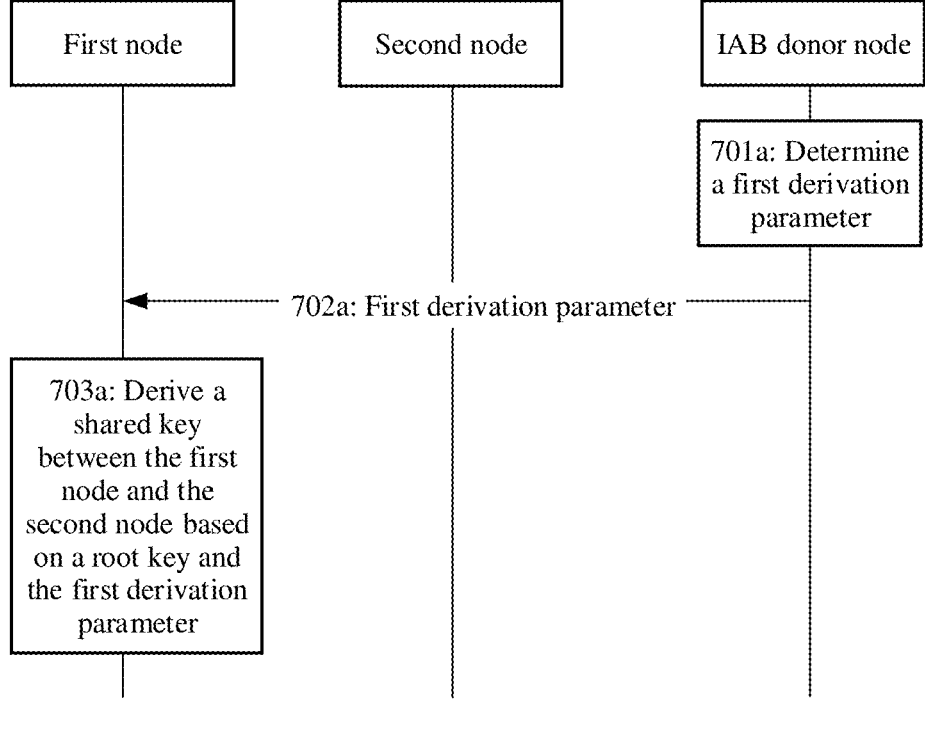
FIG. 7A is a schematic flowchart of another communication method according to this application.

FIG. 7A shows another communication method according to an embodiment of this application. On an IAB node side, the method is performed by an IAB node or a component (for example, a chip or a circuit) used in the IAB node. On an IAB donor node side, the method is performed by an IAB donor node or a component (for example, a chip or a circuit) used in the IAB donor node. For ease of description, an example in which the IAB node and the IAB donor node perform the method is used below for description.

In the method, the IAB donor node generates a shared key used to encrypt information transmitted between a first node and a second node, and then the information transmitted between the first node and the second node is encrypted by using the shared key, so that the foregoing problem of insecure communication between the IAB nodes is resolved. Both the first node and the second node are IAB nodes.

In the following descriptions, the second node is an IAB node that has registered with a core network, and after the first node accesses and registers with the core network through the second node and the IAB donor node, the following method is performed. That is, the second node is a parent node of the first node. For example, refer to the example shown in FIG. 2. After the IAB node 4 accesses and registers with a core network through the IAB node 3 and the IAB donor node, the following method is performed to generate a shared key used to encrypt information transmitted between the IAB node 3 and the IAB node 4, where the IAB node 4 is a child node of the IAB node 3.

The method includes the following steps.

Step 701a: The IAB donor node determines a first derivation parameter, where the first derivation parameter is used to derive the shared key between the first node and the second node.

The first derivation parameter includes one or more of the following:

(1) cell radio network temporary identifier (Cell Radio Network Temporary Identifier, C-RNTI) of the first node, where the C-RNTI is an identity identifier that is of an AS and that is allocated by the IAB donor node when the first node initially accesses the IAB donor node, and both the first node and the IAB donor node store the C-RNTI, but the second node is unable to learn of the C-RNTI;

(2) DU identifier (DU-ID) of the second node; and (3) DU name of the second node (DU-name).

When the C-RNTI is used as a parameter for deriving the shared key, a playback attack is prevented. When the DU-ID and the DU-name are used as parameters for deriving the shared key, the key is bound to a DU, so that the shared key is used between the first node and the second node.

Step 702a: The IAB donor node sends the first derivation parameter to the first node. Correspondingly, the first node receives the first derivation parameter.

The first node is an IAB node directly connected to the IAB donor node, or is an IAB node that is not directly connected to the IAB donor node. When the first node is directly connected to the IAB donor node, the IAB donor node sends the first derivation parameter to the first node through a wireless backhaul link between the first node and the IAB donor node. When the first node is not directly connected to the IAB donor node, the IAB donor node sends the first derivation parameter to the first node through another IAB node between the first node and the IAB donor node.

Step 703a: The first node derives the shared key between the first node and the second node based on a root key and the first derivation parameter.

The root key is a root key (for example, a KgNB) at an IAB node granularity. To be specific, different IAB nodes have different root keys. The root key is a key shared between the first node and the IAB donor node, or is a key shared between the first node and the IAB donor node after IPsec establishment is completed. The second node is unable to learn of the root key.

Alternatively, the root key is a root key (for example, $K_{donor}$) at an IAB donor node granularity. To be specific, different IAB donor nodes have different root keys, and all different IAB nodes of the IAB donor node is configured to use the root key $K_{donor}$. For example, the root key $K_{donor}$ is generated by using a random number, or is derived by the IAB donor node based on a NAS key or an AS key.

Alternatively, the root key is a root key (for example, $K_{AMF}$) at an AMF granularity. To be specific, different AMFs have different root keys, and different IAB nodes and IAB donor nodes of the AMF is configured to use the root key $K_{AMF}$.

The foregoing describes a process in which the first node obtains the shared key between the first node and the second node. The following describes a process in which the second node obtains the shared key. The process includes but is not limited to being implemented by using the following three methods.

Method 1: The IAB donor node derives the shared key based on the root key and the first derivation parameter, and sends the shared key to the second node.

The root key herein is the same as the root key used by the first node in step 703a.

For example, when the root key is the root key at the IAB node granularity, the root key is shared by the IAB donor node and the first node, but the second node is unable to learn of the root key. Further, the second node is unable to derive the shared key between the first node and the second node. In this case, the method 1 is used, so that the IAB donor node derives the shared key and sends the shared key to the second node.

Certainly, when the root key is the root key at the IAB donor node granularity or the root key at the AMF granularity, the method 1 further is used, so that the IAB donor node derives the shared key and sends the shared key to the second node.

Method 2: The IAB donor node sends the first derivation parameter to the second node, where the first derivation parameter is used to derive the shared key.

For example, when the root key is the root key at the IAB donor node granularity or the root key at the AMF granularity, the second node learns of the root key. In this case, the IAB donor node sends the first derivation parameter to the second node, and then the second node derives the shared key between the first node and the second node based on the root key and the first derivation parameter.

Method 3: The IAB donor node derives an intermediate key based on the root key and a third derivation parameter in the first derivation parameter, and then sends the intermediate key and a second derivation parameter in the first derivation parameter to the second node. The second node derives the shared key between the first node and the second node based on the intermediate key and the second derivation parameter. The third derivation parameter is a derivation parameter other than the second derivation parameter in the first derivation parameter.

For example, the first derivation parameter includes the C-RNTI, the DU-ID, and the DU-name, the second derivation parameter includes the DU-ID and the DU-name, and the third derivation parameter includes the C-RNTI; or the second derivation parameter includes the DU-ID, and the third derivation parameter includes the C-RNTI, the DU-name, and the like.

For example, the second derivation parameter includes the DU-ID and the DU-name, and the third derivation parameter includes the C-RNTI. The IAB donor node derives an intermediate key based on the root key and the C-RNTI, and then sends the intermediate key, the DU-ID, and the DU-name to the second node. The second node derives the shared key between the first node and the second node based on the intermediate key, the DU-ID, and the DU-name.

The method 3 is applicable to a scenario in which the second node learns of the root key. To be specific, the root key is the root key at the IAB donor node granularity or the root key at the AMF granularity.

In an implementation method, when a topology is updated, and the first node is not connected to the second node, that is, the first node is not a child node of the second node, the IAB donor node sends first indication information to the first node, where the first indication information is used to indicate to delete the shared key between the first node and the second node, so that the first node deletes the shared key based on the first indication information.

In another implementation method, when a topology is updated, and the first node is not connected to the second node, that is, the first node is not a child node of the second node, after receiving a connection reconfiguration message from the IAB donor node, the first node deletes the shared key between the first node and the second node, where the connection reconfiguration message is used to indicate the first node to establish a connection to a third node, and the third node is different from the second node.

In still another implementation method, when a topology is updated, and the first node is not connected to the second node, that is, the first node is not a child node of the second node, after sending a connection reconfiguration complete message to the IAB donor node, the first node deletes the shared key between the first node and the second node, where the connection reconfiguration complete message is used to indicate that the first node completes establishment of a connection to a third node.

In an implementation method, when a topology is updated, and the first node is not connected to the second node, that is, the first node is not a child node of the second node, the IAB donor node sends second indication information to the second node, where the second indication information is used to indicate to delete the shared key between the first node and the second node, so that the second node deletes the shared key based on the second indication information.

In another implementation method, when a topology is updated, and the first node is not connected to the second node, that is, the first node is not a child node of the second node, after receiving a connection release message from the IAB donor node, the second node deletes the shared key between the first node and the second node, where the connection release message is used to indicate to release a connection between the first node and the second node.

In still another implementation method, when a topology is updated, and the first node is not connected to the second node, that is, the first node is not a child node of the second node, after sending a connection reconfiguration message to the IAB donor node, the second node deletes the shared key between the first node and the second node, where the connection reconfiguration message is used to indicate the second node to establish a connection to a fourth node, and the fourth node is different from the first node.

Based on the foregoing solution, the information transmitted between the two IAB nodes is encrypted by using the shared key. This eliminates a security risk in a communication process, and help improve communication quality.

The following describes the embodiment corresponding to FIG. 7A with reference to an example. In this example, an IAB node 1 has registered with a core network through an IAB donor node, and then an IAB node 2 accesses and registers with the core network through the IAB node 1 and the IAB donor node. After the registration succeeds, the IAB node 2 is a child node of the IAB node 1.

Figure 7B:
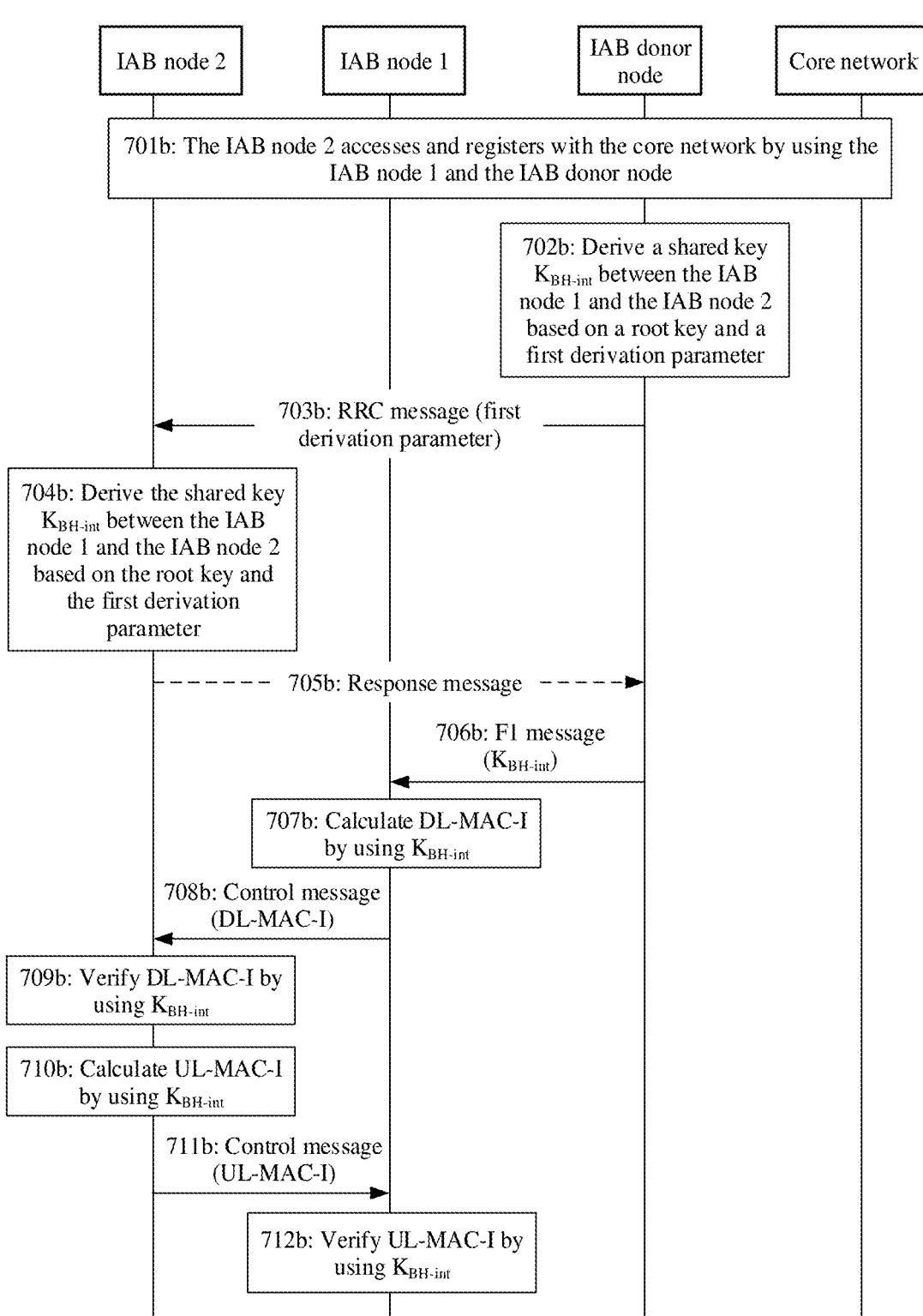
FIG. 7B is a schematic flowchart of another communication method according to this application.

FIG. 7B is a schematic flowchart of another communication method according to this application. The method includes the following steps.

Step 701*b*: The IAB node 2 accesses and registers with the core network through the IAB node 1 and the IAB donor node.

A main process of this step includes: starting an MT of the IAB node 2, starting a backhaul link, starting a DU, and the like. Starting the MT includes initial registration, NAS and AS security context setup, and another process. In this case, a function of the MT is similar to that of a common terminal.

For a process in which the IAB node 2 accesses and registers with the core network, refer to the procedure shown in FIG. 3. Details are not described again.

Step 702*b*: The IAB donor node derives a shared key $K_{BH\text{-}int}$ between the IAB node 1 and the IAB node 2 based on a root key and a first derivation parameter.

Step 703*b*: The IAB donor node sends the first derivation parameter to the IAB node 2 by using a security protected RRC message. Correspondingly, the IAB node 2 receives the first derivation parameter.

In an implementation method, the RRC message is a special RRC message, the RRC message carries the first derivation parameter, and the RRC message is used to indicate to derive the key $K_{BH\text{-}int}$ based on the first derivation parameter. Therefore, after receiving the RRC message, the IAB node 2 identifies, by using a name of the RRC message and the carried first derivation parameter, that the RRC message is used to indicate to derive the key $K_{BH\text{-}int}$ based on the first derivation parameter.

In another implementation method, the RRC message is an existing RRC message, the RRC message carries the first derivation parameter and indication information, and the indication information is used to indicate to derive the key $K_{BH\text{-}int}$ based on the first derivation parameter. Therefore, after receiving the RRC message, the IAB node 2 determines, by using the indication information and the first derivation parameter that are carried in the RRC message, to derive the shared key $K_{BH\text{-}int}$ based on the first derivation parameter and the root key.

Step 704*b*: The IAB node 2 derives, based on the root key and the first derivation parameter, the shared key $K_{BH\text{-}int}$ shared between the IAB node 1 and the IAB node 2.

A method for deriving $K_{BH\text{-}int}$ by the IAB node 2 is the same as the method for deriving $K_{BH\text{-}int}$ by the IAB donor node in step 702*b*.

Step 705*b*: The IAB node 2 sends a response message to the IAB donor node. Correspondingly, the IAB donor node receives the response message.

Step 705*b* is an optional step.

Step 706*b*: The IAB donor node sends the shared key $K_{BH\text{-}int}$ to the IAB node 1 by using an F1 message, to complete key sharing between the IAB node 1 and the IAB node 2.

The IAB node 1 receives and verifies the F1 message, and after the verification succeeds, stores and uses the key $K_{BH\text{-}int}$ to protect security of data transmission between the IAB node 1 and the IAB node 2.

In an alternative implementation method, the shared key $K_{BH\text{-}int}$ is not carried in step 706*b*, but an intermediate key and a second derivation parameter are carried, and then the IAB node 1 derives the key $K_{BH\text{-}int}$ based on the intermediate key and the second derivation parameter. The intermediate key is derived based on the root key and a third derivation parameter, and the third derivation parameter is a derivation parameter other than the second derivation parameter in the first derivation parameter.

In an implementation method, in the foregoing embodiment, a key allocation mechanism is triggered when the IAB node 2 just accesses the network, so that the IAB node 1 and the IAB node 2 shares a pair of keys.

In another implementation method, deletion of an old key and a mechanism for allocating a new key further is triggered when a topology is updated, so that the IAB node 1 and the IAB node 2 shares a new pair of keys. For example, when the topology is updated, after receiving a connection release message (for example, a UE context release command) sent by the IAB donor node, a parent node (namely, the IAB node 1) deletes the shared key between the IAB node 1 and the IAB node 2. Alternatively, the IAB node 1 receives indication information sent by the IAB donor node, where the indication information is used to indicate to delete the shared key between the IAB node 1 and the IAB node 2. For another example, when the topology is updated, after determining that path reselection is completed (for example, sending an RRC connection reconfiguration complete (RRC Connection Reconfiguration Complete) message), the child node (namely, the IAB node 2) deletes the shared key between the IAB node 2 and the IAB node 1. Alternatively, the IAB node 2 receives indication information sent by the IAB donor node, where the indication information is used to indicate to delete the shared key between the IAB node 2 and the IAB node 1. For another example, after the topology is updated, if the IAB donor node finds that the IAB node completes path reselection (for example, receives an RRC connection reconfiguration complete message), or the IAB donor node configures a new wireless backhaul path, operations in step 702*b* to step 706*b* in the foregoing embodiment is performed, to configure a new shared key for a new IAB node pair. For example, after the topology is updated, the IAB node 1 is not connected to the IAB node 2, but the IAB node 1 is connected to an IAB node 3, and the IAB node 2 is connected to an IAB node 4. In this case, a new shared key is allocated to the IAB node 1 and the IAB node 3, and another new shared key is configured for the IAB node 2 and the IAB node 4.

When information needs to be transmitted between the IAB node 1 and the IAB node 2, the key $K_{BH\text{-}int}$ shared between the IAB node 1 and the IAB node 2 is used to protect the transmitted information. For example, an information transmission process includes the following step 707*b* to step 712*b*.

When the IAB node 1 needs to send a downlink message to the IAB node 2, the following step 707*b* to step 709*b* are performed. When the IAB node 2 needs to send an uplink message to the IAB node 1, the following step 710*b* to step 712*b* are performed.

Step 707*b*: The IAB node 1 calculates an integrity protection value DL-MAC-I by using $K_{BH\text{-}int}$.

DL-MAC-I is calculated based on $K_{BH\text{-}int}$, a downlink sequence value, a direction number, and a to-be-protected downlink message (for example, a BAP message). $K_{BH\text{-}int}$ is an input key, and the downlink sequence value, the direction number, and the to-be-protected downlink message are input parameters. The downlink sequence value is used to prevent a playback attack. A downlink direction number is 0, and an uplink direction number is 1.

Step 708*b*: The IAB node 1 sends a control message to the IAB node 2, where the control message carries DL-MAC-I and the downlink message. Correspondingly, the IAB node 2 receives the control message.

Step 709*b*: The IAB node 2 verifies DL-MAC-I by using $K_{BH\text{-}int}$.

Specifically, the IAB node 2 verifies DL-MAC-I by using the downlink message and $K_{BH\text{-}int}$. If the IAB node 2 successfully verifies DL-MAC-I, the received downlink message is correct.

Step 710*b*: The IAB node 2 calculates an integrity protection value UL-MAC-I by using $K_{BH\text{-}int}$.

UL-MAC-I is calculated based on $K_{BH\text{-}int}$, an uplink sequence value, a direction number, and a to-be-protected uplink message. $K_{BH\text{-}int}$ is an input key, and the uplink sequence value, the direction number, and the to-be-protected uplink message are input parameters. The uplink sequence value is used to prevent a playback attack.

Step 711*b*: The IAB node 2 sends a control message to the IAB node 1, where the control message carries UL-MAC-I and the uplink message. Correspondingly, the IAB node 1 receives the control message.

Step 712*b*: The IAB node 1 verifies UL-MAC-I by using $K_{BH\text{-}int}$.

Specifically, the IAB node 1 verifies UL-MAC-I by using the uplink message and $K_{BH\text{-}int}$. If the IAB node 1 successfully verifies UL-MAC-I, the received uplink message is correct.

In the foregoing solution, a process of configuring the shared key between the IAB nodes is implemented. The shared key is used to encrypt the information (for example, a signal transmission exception indication) transmitted between the IAB nodes, so that the security of the data transmission between the IAB nodes is ensured, thereby helping improve communication quality.

Figure 8A:
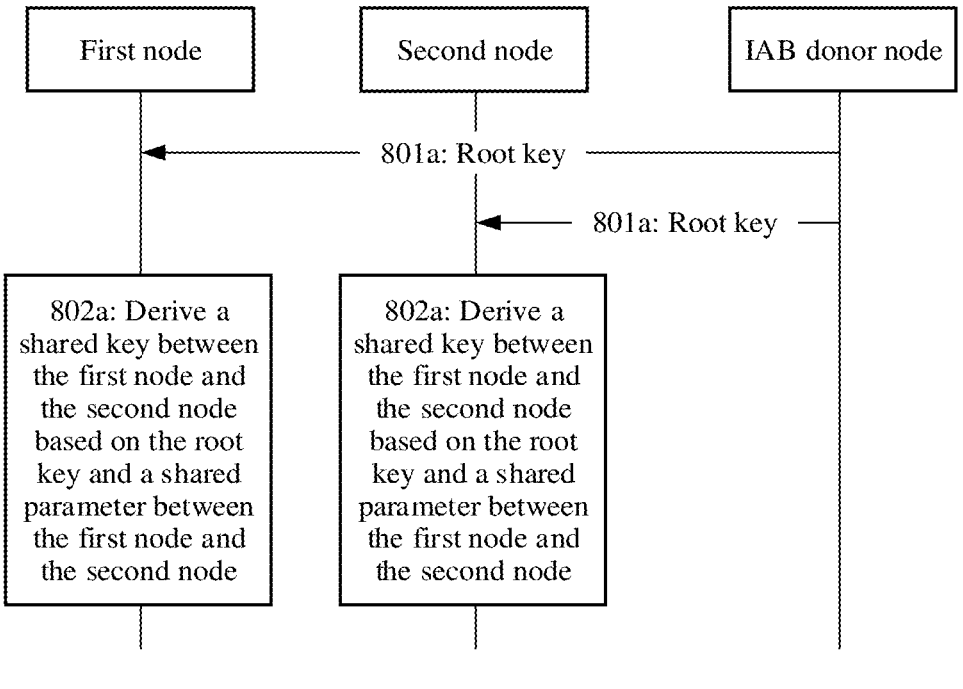
FIG. 8A is a schematic flowchart of another communication method according to this application.

FIG. 8A shows another communication method according to an embodiment of this application. On an IAB node side, the method is performed by an IAB node or a component (for example, a chip or a circuit) used in the IAB node. On an IAB donor node side, the method is performed by an IAB donor node or a component (for example, a chip or a circuit) used in the IAB donor node. For ease of description, an example in which the IAB node and the IAB donor node perform the method is used below for description.

In the method, the IAB donor node separately sends a root key to a first node and a second node, so that the first node and the second node separately generate a same shared key based on the root key, and then the first node and the second node encrypt transmitted information by using the shared key. Therefore, the foregoing problem of insecure communication between the IAB nodes is resolved. Both the first node and the second node are IAB nodes. The first node is connected to the second node.

The method includes the following steps.

Step 801*a*: The IAB donor node sends the root key to the first node and the second node, where the root key is a root key at an IAB donor node granularity or an AMF granularity.

For example, step 801*a* is performed after the first node accesses and registers with a core network.

Step 802*a*: The first node and the second node derive the shared key between the first node and the second node based on the root key and a shared parameter between the first node and the second node, where the shared key is used to encrypt the information transmitted between the first node and the second node.

The shared parameter includes one or more of the following: a BAP layer parameter (for example, UE-bearer-ID or BAP-ID) of the first node, a BAP layer parameter (for example, UE-bearer-ID or BAP-ID) of the second node, an RLC layer shared parameter (for example, a logical channel identifier (logical channel ID, LCID)) between the first node and the second node, and a shared parameter (for example, SDAP-config) between a DU of the first node and an MT of the second node.

Optionally, after disconnecting from the IAB donor node, the first node deletes the root key. After disconnecting from the IAB donor node, the second node deletes the root key.

In the foregoing solution, a process of configuring the shared key between the IAB nodes is implemented. The shared key is used to encrypt the information (for example, a signal transmission exception indication) transmitted between the IAB nodes, so that security of data transmission between the IAB nodes is ensured, thereby helping improve communication quality.

Figure 8B:
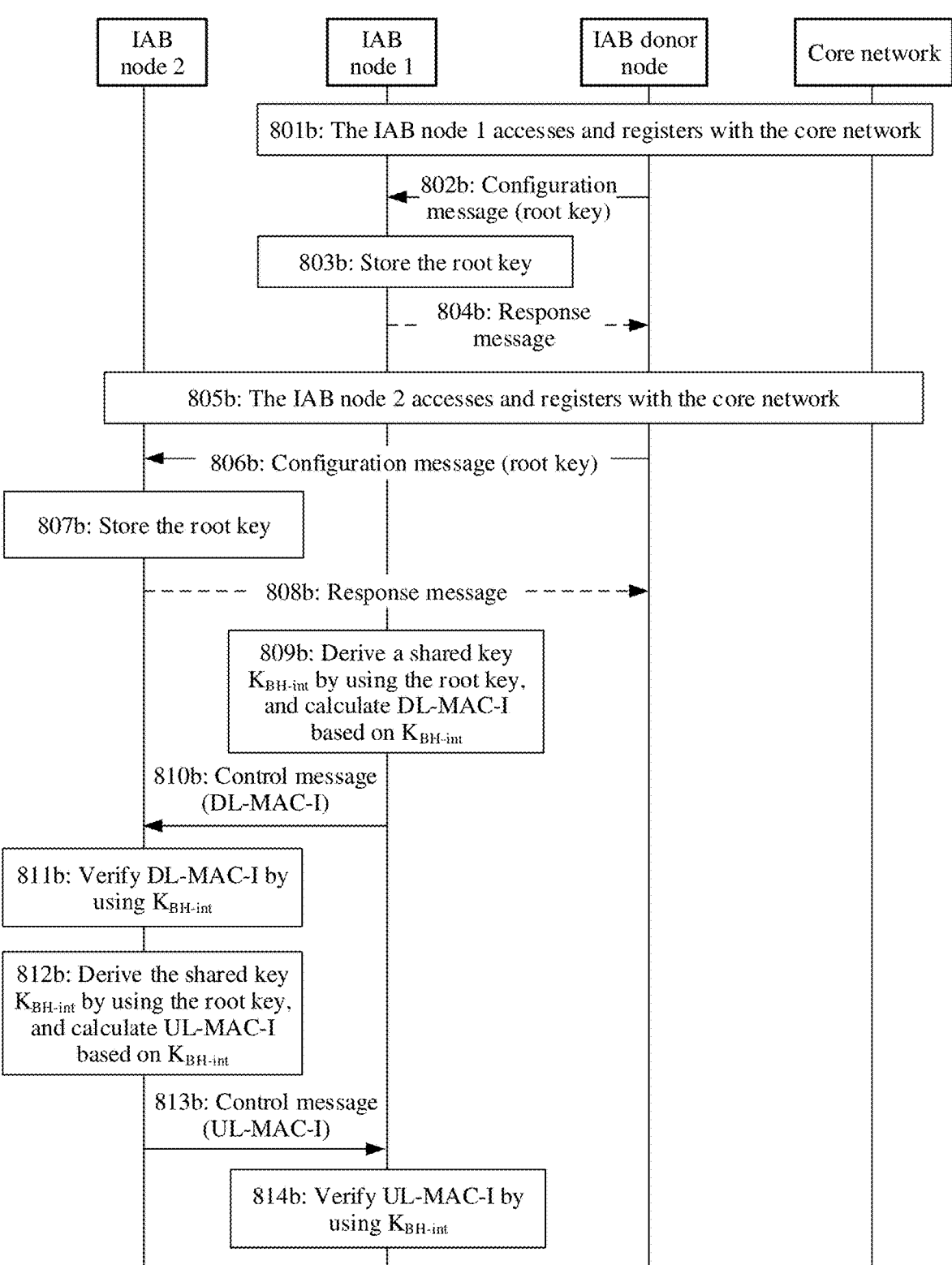
FIG. 8B is a schematic flowchart of another communication method according to this application.

The following describes the embodiment corresponding to FIG. 8A with reference to an example. FIG. 8B is a schematic flowchart of another communication method according to this application. The method includes the following steps.

Step 801b: An IAB node 1 accesses and registers with a core network.

A main process of this step includes: starting an MT of the IAB node 1, starting a backhaul link, starting a DU, and the like. Starting the MT includes initial registration, NAS and AS security context setup, and another process. In this case, a function of the MT is similar to that of a common terminal.

For a implementation of the process, refer to the descriptions shown in FIG. 3. Details are not described herein again.

Step 802b: An IAB donor node sends a configuration message to the IAB node 1, where the configuration message carries a root key, and correspondingly, the IAB node 1 receives the configuration message.

For example, the root key is a root key (for example, $K_{donor}$) at an IAB donor node granularity. To be specific, different IAB donor nodes have different root keys, and different IAB nodes of the IAB donor node is configured to use the root key $K_{donor}$. For example, the root key $K_{donor}$ is generated by using a random number, or is derived by the IAB donor node based on a NAS key or an AS key.

For another example, the root key is a root key (for example, $K_{AMF}$) at an AMF granularity. To be specific, different AMFs have different root keys, and different IAB nodes and IAB donor nodes of the AMF is configured to use the root key $K_{AMF}$.

The configuration message is an RRC message, and is protected by an AS. Alternatively, the configuration message is an F1 message, and under IPsec protection after IPsec establishment.

Optionally, after the IAB node 1 switches to a new IAB donor node, the new IAB donor node further sends a new root key to the IAB node 1.

Step 803b: The IAB node 1 receives and verifies the root key sent by the IAB donor node, and stores the root key after the verification succeeds.

Step 804b: The IAB node 1 sends an answer message to the IAB donor node. Correspondingly, the IAB donor node receives the answer message.

The answer message is used to notify the IAB donor node that the root key has been received.

Step 804b is an optional step.

Step 805b: An IAB node 2 accesses and registers with the core network.

A main process of this step includes: starting an MT of the IAB node 2, starting a backhaul link, starting a DU, and the like. Starting the MT includes initial registration, NAS and AS security context setup, and another process. In this case, a function of the MT is similar to that of a common terminal.

For a implementation of the process, refer to the descriptions shown in FIG. 3. Details are not described herein again.

Step 806b: The IAB donor node sends a configuration message to the IAB node 2, where the configuration message carries a root key, and correspondingly, the IAB node 2 receives the configuration message.

The root key is the same as the root key in step 802b.

The configuration message is an RRC message, and is protected by an AS. Alternatively, the configuration message is an F1 message, and under IPsec protection after IPsec establishment.

Optionally, after the IAB node 2 switches to a new IAB donor node, the new IAB donor node further sends a new root key to the IAB node 2.

Step 807b: The IAB node 2 receives and verifies the root key sent by the IAB donor node, and stores the root key after the verification succeeds.

Step 808b: The IAB node 2 sends an answer message to the IAB donor node. Correspondingly, the IAB donor node receives the answer message.

The answer message is used to notify the IAB donor node that the root key has been received.

Step 808b is an optional step.

For example, the IAB node 1 is a parent node and the IAB node 2 is a child node. When the IAB node 1 needs to send a downlink message to the IAB node 2, the following step 809b to step 811b are performed. When the IAB node 2 needs to send an uplink message to the IAB node 1, the following step 812b to step 814b are performed.

Step 809b: The IAB node 1 calculates a shared key $K_{BH-int}$ by using the root key, and calculates an integrity protection value DL-MAC-I by using $K_{BH-int}$.

For example, the IAB node 1 calculates $K_{BH-int}$ by using the root key and a shared parameter, where the shared parameter includes but is not limited to one or more of the following: a BAP layer parameter (for example, UE-bearer-ID or BAP-ID) of the IAB node 1, a BAP layer parameter (for example, UE-bearer-ID or BAP-ID) of the IAB node 2, an RLC layer shared parameter (for example, an LCID) between the IAB node 1 and the IAB node 2, and a shared parameter (for example, SDAP-config) between the DU of the IAB node 1 and the MT of the IAB node 2.

DL-MAC-I is calculated based on $K_{BH-int}$, a downlink sequence value, a direction number, and a to-be-protected downlink message (for example, a BAP message). $K_{BH-int}$ is an input key, and the downlink sequence value, the direction number, and the to-be-protected downlink message are input parameters. The downlink sequence value is used to prevent a playback attack. A downlink direction number is 0, and an uplink direction number is 1.

Step 810b: The IAB node 1 sends a control message to the IAB node 2, where the control message carries DL-MAC-I and the downlink message. Correspondingly, the IAB node 2 receives the control message.

Step 811b: The IAB node 2 verifies DL-MAC-I by using $K_{BH-int}$.

Specifically, the IAB node 2 verifies DL-MAC-I by using the downlink message and $K_{BH-int}$. If the IAB node 2 successfully verifies DL-MAC-I, the received downlink message is correct.

Step 812b: The IAB node 2 calculates an integrity protection value UL-MAC-I by using $K_{BH-int}$.

For example, the IAB node 2 calculates $K_{BH-int}$ by using the root key and the shared parameter. For the shared parameter herein, refer to the foregoing descriptions. Details are not described again.

UL-MAC-I is calculated based on $K_{BH-int}$, an uplink sequence value, a direction number, and a to-be-protected uplink message (for example, a BAP message). $K_{BH-int}$ is an input key, and the uplink sequence value, the direction number, and the to-be-protected uplink message are input parameters. The uplink sequence value is used to prevent a playback attack. A downlink direction number is 0, and an uplink direction number is 1.

Step 813*b*: The IAB node 2 sends a control message to the IAB node 1, where the control message carries UL-MAC-I and the uplink message. Correspondingly, the IAB node 1 receives the control message.

Step 814*b*: The IAB node 1 verifies UL-MAC-I by using $K_{BH-int}$.

Specifically, the IAB node 1 verifies UL-MAC-I by using the uplink message and $K_{BH-int}$. If the IAB node 1 successfully verifies UL-MAC-I, the received uplink message is correct.

In an implementation method, when the IAB donor node determines that a quantity of IAB nodes leaving the IAB donor node exceeds a preset threshold, the IAB donor node deletes the root key. Optionally, the IAB donor node alternatively deletes the root key by using an IAB node of the IAB donor node.

In another implementation method, after an IAB node leaves an old IAB donor node (that is, disconnects from the IAB donor node), the IAB node deletes a root key stored in the IAB node.

In the foregoing solution, a process of configuring the shared key between the IAB nodes is implemented. The shared key is used to encrypt information (for example, a signal transmission exception indication) transmitted between the IAB nodes, so that security of data transmission between the IAB nodes is ensured, thereby helping improve communication quality.

The foregoing mainly describes the solutions provided in this application from a perspective of interaction between the network elements. To implement the foregoing functions, each network element includes a corresponding hardware structure and/or software module for implementing each function. A person skilled in the art is easily aware that, in combination with the units and algorithm steps in the examples described in embodiments disclosed in this specification, the present embodiment is implemented by hardware or a combination of hardware and computer software. Whether a function is performed by hardware or hardware driven by computer software depends on particular applications and design constraints of the technical solutions. A person skilled in the art is configured to use different methods to implement the described functions for each particular application, but the implementation going beyond the scope of the present embodiment is unconsidered.

In the foregoing method embodiments, corresponding steps or operations implemented by the IAB node further is implemented by a component (for example, a chip or a circuit) configured in the IAB node, and corresponding steps or operations implemented by the IAB donor node further is implemented by a component (for example, a chip or a circuit) configured in the IAB donor node.

An embodiment of this application further provides an apparatus for implementing any one of the foregoing methods. For example, the apparatus includes units (or means) configured to implement the steps performed by the IAB node in any one of the foregoing methods. For another example, another apparatus is further provided, and includes units (or means) configured to implement the steps performed by the IAB donor node in any one of the foregoing methods.

Figure 9:
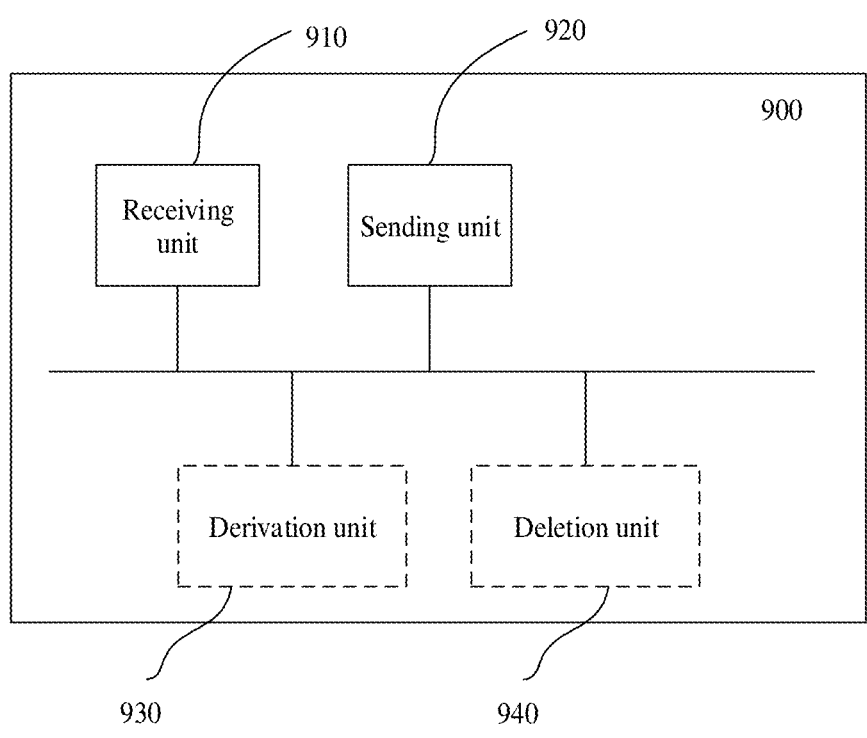
FIG. 9 is a schematic diagram of a communication apparatus according to this application.

FIG. 9 is a schematic diagram of a communication apparatus according to an embodiment of this application. The apparatus is configured to implement the corresponding steps performed by the first node in the foregoing method embodiment. As shown in FIG. 9, the apparatus 900 includes a receiving unit 910 and a sending unit 920. Optionally, the apparatus further includes a derivation unit 930 and a deletion unit 940.

Solution 1:

The receiving unit 910 is configured to receive a first message from a second node, where the first message includes first indication information, the first message is not security protected, and both the apparatus and the second node are integrated access and backhaul IAB nodes. The sending unit 920 is configured to send a second message to an IAB donor node, where the second message is used to indicate that the first node receives the first indication information, and the second message is security protected. The receiving unit 910 is further configured to receive a third message from the IAB donor node, where the third message includes second indication information, the second indication information is used to indicate whether the first indication information is trustworthy, and the third message is security protected.

In a possible implementation method, the first message further includes an identifier of a third node, the first indication information is used to indicate that a signal transmission exception occurs on the third node, and the third node is an IAB node; and the second message further includes the identifier of the third node, and that the second message is used to indicate that the first node receives the first indication information includes: the second message is used to indicate that the first node receives the first indication information from the third node.

In a possible implementation method, the identifier of the third node is an address of the third node or an identifier of a first path corresponding to the third node, the first path is a path on which the signal transmission exception occurs, and the first path includes the third node.

In a possible implementation method, that the second message is used to indicate that the first node receives the first indication information includes: The second message includes third indication information, and the third indication information is used to indicate that the first node receives the first indication information.

In a possible implementation method, the first message is an internet protocol IP layer message, an adaptation Adapt layer message, a radio link control RLC message, a media access control MAC message, or a physical PHY layer message; the second message is an F1 application protocol F1AP layer message, a stream control transmission protocol SCTP layer message, or an internet protocol security IPsec layer message; and the third message is an F1AP layer message, an SCTP layer message, or an IPsec layer message.

Solution 2

The receiving unit 910 is configured to receive a first derivation parameter from an IAB donor node, where the first derivation parameter includes one or more of the following: a C-RNTI of the first node, a DU identifier of a second node, and a DU name of the second node, the first node is an IAB node, the second node is an IAB node connected to the first node, and the first node accesses the IAB donor node through the second node. The derivation unit 930 is configured to derive a shared key between the first node and the second node based on a root key and the first derivation parameter, where the shared key is used to encrypt information transmitted between the first node and the second node.

In a possible implementation method, the root key is a key at an IAB node granularity, a key at an IAB donor node granularity, or a key at an access and mobility management function AMF granularity.

In a possible implementation method, the receiving unit 910 is further configured to receive first indication information from the IAB donor node, where the first indication information is used to indicate to delete the shared key between the first node and the second node. The deletion unit 940 is configured to delete the shared key based on the first indication information.

In a possible implementation method, the deletion unit 940 is configured to: after the receiving unit 910 receives a connection reconfiguration message from the IAB donor node, delete the shared key between the first node and the second node, where the connection reconfiguration message is used to indicate the first node to establish a connection to a third node, and the third node is different from the second node; or the deletion unit 940 is configured to: after the sending unit 920 sends a connection reconfiguration complete message to the IAB donor node, delete the shared key between the first node and the second node, where the connection reconfiguration complete message is used to indicate that the first node completes establishment of a connection to a third node.

Solution 3

The receiving unit 910 is configured to receive a root key from an IAB donor node, where the root key is a root key at an IAB donor node granularity or an access and mobility management function AMF granularity, and the first node is an IAB node. The derivation unit 930 is configured to derive a shared key between the first node and a second node based on a shared parameter between the first node and the second node and the root key, where the shared key is used to encrypt information transmitted between the first node and the second node, and the first node is connected to the second node.

In a possible implementation method, the shared parameter includes one or more of the following: a backhaul adaptation protocol BAP layer parameter of the first node, a BAP layer parameter of the second node, a radio link control RLC layer shared parameter between the first node and the second node, and a shared parameter between a DU of the first node and an MT of the second node.

In a possible implementation method, the deletion unit 940 is configured to delete the root key after disconnecting from the IAB donor node.

The foregoing units further is referred to as modules, circuits, or the like, and the foregoing units are independently disposed, or all or some of the foregoing units are integrated.

In some possible implementations, the sending unit 920 and the receiving unit 910 alternatively is implemented by a transceiver unit, or the sending unit 920 and the receiving unit 910 is collectively referred to as a transceiver unit. The derivation unit 930 and the deletion unit 940 alternatively is implemented by a processing unit, or the derivation unit 930 and the deletion unit 940 is collectively referred to as a processing unit.

The sending unit 920, the receiving unit 910, or the transceiver unit further is referred to as a communication interface, and the processing unit further is referred to as a processor.

Optionally, the communication apparatus 900 further includes a storage unit. The storage unit is configured to store data or instructions (which further is referred to as code or a program). The foregoing units interacts with or be coupled to the storage unit, to implement a corresponding method or function. For example, the processing unit reads the data or the instructions in the storage unit, so that the communication apparatus implements the method in the foregoing embodiment.

Figure 10:
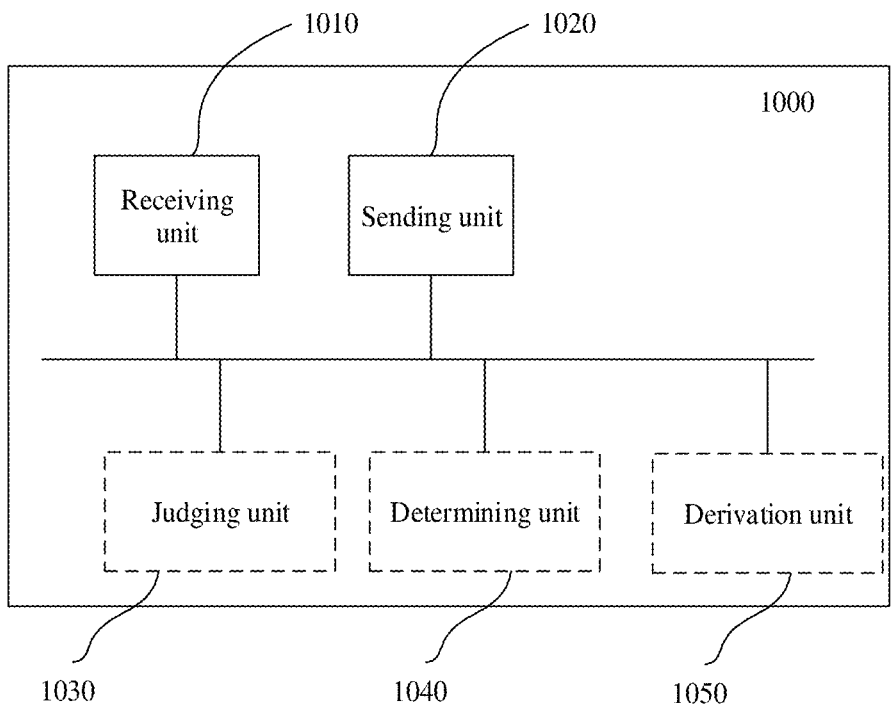
FIG. 10 is a schematic diagram of another communication apparatus according to this application.

FIG. 10 is a schematic diagram of a communication apparatus according to an embodiment of this application. The apparatus is configured to implement the corresponding steps performed by the IAB donor node in the foregoing method embodiment. As shown in FIG. 10, the apparatus 1000 includes a receiving unit 1010 and a sending unit 1020. Optionally, the apparatus further includes a judging unit 1030, a determining unit 1040, and a derivation unit 1050.

Solution 1:

The receiving unit 1010 is configured to receive a second message from a first node, where the second message is used to indicate that the first node receives first indication information, the second message is security protected, and the first node is an IAB node. The judging unit 1030 is configured to determine whether the first indication information is trustworthy. The sending unit 1020 is configured to send a third message to the first node, where the third message includes second indication information, the second indication information is used to indicate whether the first indication information is trustworthy, and the third message is security protected.

In a possible implementation method, the second message further includes an identifier of a third node, the identifier of the third node is an address of the third node or an identifier of a first path corresponding to the third node, the first path is a path on which a signal transmission exception occurs, and the first path includes the third node; and that the second message is used to indicate that the first node receives first indication information includes: the second message is used to indicate that the first node receives the first indication information from the third node.

In a possible implementation method, the judging unit 1030 is specifically configured to: determine that the signal transmission exception occurs on the first path, and determine that the first indication information is trustworthy.

In a possible implementation method, the receiving unit 1010 is further configured to receive fourth indication information from the third node, where the fourth indication information is used to indicate that the signal transmission exception occurs on the first path.

In a possible implementation method, that the second message is used to indicate that the first node receives first indication information includes: The second message includes third indication information, and the third indication information is used to indicate that the first node receives the first indication information.

Solution 2

The receiving unit 1010 is configured to receive a first message from a first node, where the first message includes first indication information, the first message is security protected, and the first node is an IAB node. The determining unit 1040 is configured to determine a second node based on the first indication information, where the second node is an IAB node. The sending unit 1020 is configured to send a second message to the second node, where the second message includes second indication information, the second message is security protected, and the second indication information corresponds to the first indication information.

In a possible implementation method, the first message further includes information about a first path, the first indication information is used to indicate that a signal transmission exception occurs on the first path, and the first path includes the first node. The determining unit 1040 is specifically configured to determine, based on the first indication information, information about a network topology, and the information about the first path, the second node that is in the network topology and that is affected by the signal transmission exception, where the information about the network topology includes a connection relationship between the apparatus and at least two IAB nodes, and the network topology includes the first path.

In a possible implementation method, the first path further includes a third node, and the information about the first path includes an address of the third node and an address of the first node; or the information about the first path includes an identifier of the first path.

Solution 3

The determining unit 1040 is configured to determine a first derivation parameter, where the first derivation parameter includes one or more of the following: a cell radio network temporary identifier C-RNTI of a first node, a distributed unit DU identifier of a second node, and a DU name of the second node, the first node is an IAB node, the second node is an IAB node, the second node is connected to the first node, and the first node accesses the IAB donor node through the second node. The sending unit 1020 is configured to send the first derivation parameter to the first node, where the first derivation parameter is used to derive a shared key between the first node and the second node, and the shared key is used to encrypt information transmitted between the first node and the second node.

In a possible implementation method, the derivation unit 1050 is configured to derive the shared key based on a root key and the first derivation parameter, and the sending unit 1020 is further configured to send the shared key to the second node. Alternatively, the sending unit 1020 is further configured to send the first derivation parameter to the second node, where the first derivation parameter is used to derive the shared key. Alternatively, the sending unit 1020 is further configured to send an intermediate key and a second derivation parameter in the first derivation parameter, where the intermediate key and the second derivation parameter are used to derive the shared key, the intermediate key is derived based on the root key and a third derivation parameter in the first derivation parameter, and the third derivation parameter is a derivation parameter other than the second derivation parameter in the first derivation parameter.

In a possible implementation method, the root key is a key at an IAB node granularity, a key at an IAB donor node granularity, or a key at an access and mobility management function AMF granularity.

The foregoing units further is referred to as modules, circuits, or the like, and the foregoing units are independently disposed, or all or some of the foregoing units are integrated.

In some possible implementations, the sending unit 1020 and the receiving unit 1010 alternatively is implemented by a transceiver unit, or the sending unit 1020 and the receiving unit 1010 is collectively referred to as a transceiver unit. The judging unit 1030, the determining unit 1040, and the derivation unit 1050 further is implemented by a processing unit; or the judging unit 1030, the determining unit 1040, and the derivation unit 1050 further is collectively referred to as a processing unit.

The sending unit 1020, the receiving unit 1010, or the transceiver unit further is referred to as a communication interface, and the processing unit further is referred to as a processor.

Optionally, the communication apparatus 1000 further includes a storage unit. The storage unit is configured to store data or instructions (which further is referred to as code or a program). The foregoing units interacts with or be coupled to the storage unit, to implement a corresponding method or function. For example, the processing unit reads the data or the instructions in the storage unit, so that the communication apparatus implements the method in the foregoing embodiment.

Division into the units in the foregoing apparatuses is logical function division. In an actual implementation, all or some of the units are integrated into a physical entity, or is physically separated. In addition, the units in the apparatus is implemented in a form of software invoked by a processing element, or is implemented in a form of hardware; or some units are implemented in a form of software invoked by a processing element, and some units are implemented in a form of hardware. For example, each unit is a separately disposed processing element, or is integrated into a chip of the apparatus for implementation. Alternatively, each unit is stored in the memory in a form of a program to be invoked by a processing element of the apparatus to perform a function of the unit. In addition, all or some of the units are integrated, or is implemented independently. The processing element herein further is referred to as a processor, and is an integrated circuit having a signal processing capability. In an implementation process, the steps in the foregoing method or the foregoing units are implemented by using a hardware integrated logic circuit in the processor element, or is implemented in a form of software invoked by the processing element.

For example, a unit in any one of the foregoing apparatuses is one or more integrated circuits configured to implement the foregoing method, for example, one or more application-specific integrated circuits (Application-Specific Integrated Circuits, ASICs), one or more microprocessors (digital signal processors, DSPs), one or more field programmable gate arrays (Field Programmable Gate Arrays, FPGAs), or a combination of at least two of the integrated circuits. For another example, when the unit in the apparatus is implemented in a form of a program invoked by a processing element, the processing element is a general-purpose processor, for example, a central processing unit (Central Processing Unit, CPU) or another processor that invokes the program. For another example, the units are integrated and implemented in a form of a system-on-a-chip (system-on-a-chip, SOC).

The foregoing unit for receiving (for example, the receiving unit) is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit for sending (for example, the sending unit) is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 11:
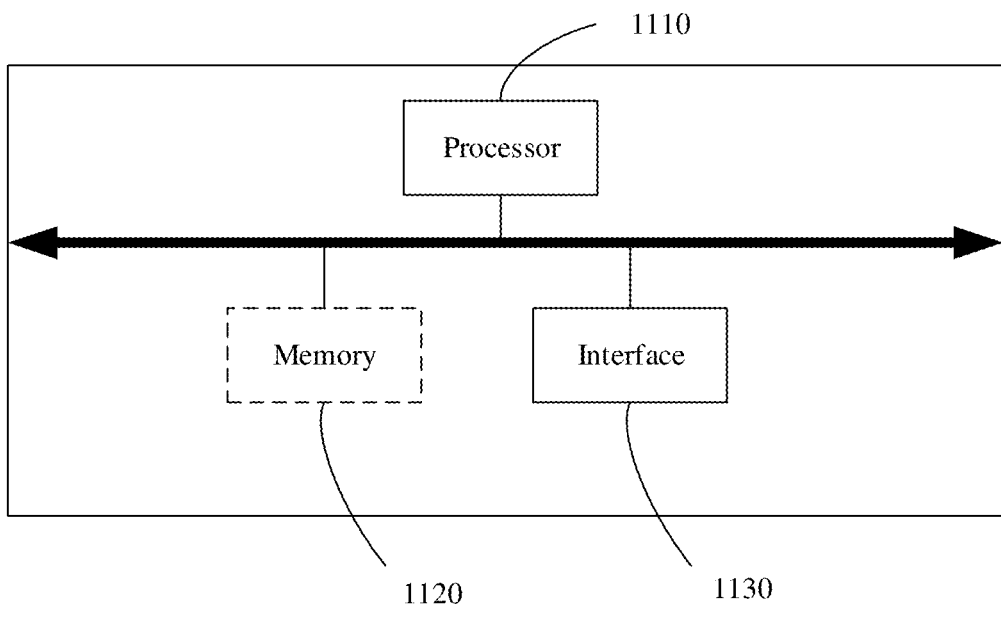
FIG. 11 is a schematic diagram of an IAB node according to this application.

FIG. 11 is a schematic diagram of a structure of an IAB node according to an embodiment of this application. The IAB node is configured to implement operations of the IAB node in the foregoing embodiment. As shown in FIG. 11, the IAB node includes a processor 1110 and an interface 1130, and optionally, further includes a memory 1120. The interface 1130 is configured to communicate with another device.

The method performed by the IAB node in the foregoing embodiment is implemented by the processor 1110 by invoking a program stored in a memory (which is the memory 1120 in the IAB node or an external memory). That is, an apparatus used in the IAB node includes a processor 1110. The processor 1110 invokes the program in the memory, to perform the method performed by the IAB node in the foregoing method embodiment. The processor herein is an integrated circuit having a signal processing capability, for example, a CPU. The apparatus used in the IAB node is implemented by one or more integrated circuits configured to implement the foregoing method, for example, one or more ASICs, one or more microprocessors DSPs, one or more FPGAs, or a combination of at least two of these types of integrated circuits. Alternatively, the foregoing implementations are combined.

Figure 12:
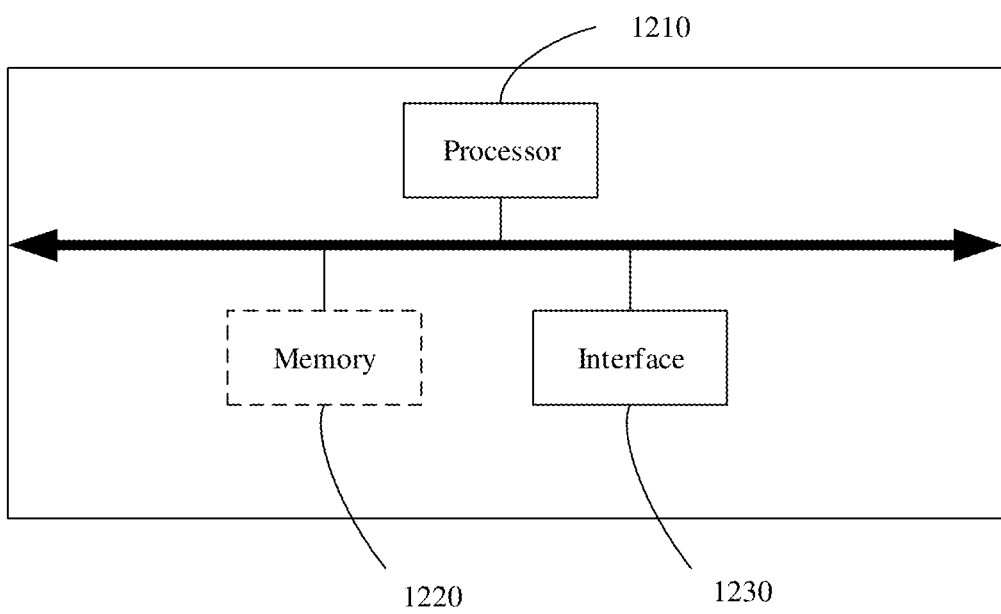
FIG. 12 is a schematic diagram of an IAB donor node according to this application.

FIG. 12 is a schematic diagram of a structure of an IAB donor node according to an embodiment of this application. The IAB donor node is configured to implement operations of the IAB donor node in the foregoing embodiment. As shown in FIG. 12, the IAB donor node includes a processor 1210 and an interface 1230, and optionally, further includes a memory 1220. The interface 1230 is configured to communicate with another device.

The method performed by the donor IAB node in the foregoing embodiment is implemented by the processor 1210 by invoking a program stored in a memory (which is the memory 1220 in the IAB donor node or an external memory). That is, an apparatus used in the IAB donor node includes a processor 1210. The processor 1210 invokes the program in the memory, to perform the method performed by the IAB donor node in the foregoing method embodiment. The processor herein is an integrated circuit having a signal processing capability, for example, a CPU. The apparatus used in the IAB donor node is implemented by one or more integrated circuits configured to implement the foregoing method, for example, one or more ASICs, one or more microprocessors DSPs, one or more FPGAs, or a combination of at least two of these types of integrated circuits. Alternatively, the foregoing implementations are combined.

An embodiment of this application further provides a communication system, including the communication apparatus shown in FIG. 9 and the communication apparatus shown in FIG. 10.

Another embodiment of this application provides a communication system, including the IAB node shown in FIG. 11 and the IAB donor node shown in FIG. 12.

All or some of the foregoing embodiments are implemented by using software, hardware, firmware, or any combination thereof. When software is used to implement the embodiments, all or some of the embodiments are implemented in a form of a computer program product. The computer program product includes one or more computer instructions. When the computer program instructions are loaded and executed on a computer, all or some of the procedures or the functions according to embodiments of this application are generated. The computer is a general-purpose computer, a special-purpose computer, a computer network, or another programmable apparatus. The computer instructions are stored in a computer-readable storage medium or is transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, for example, a server or a data center, integrating one or more usable media. The usable medium is a magnetic medium (for example, a floppy disk, a hard disk drive, or a magnetic tape), an optical medium (for example, a DVD), a semiconductor medium (for example, a solid-state drive (solid-state drive, SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor is a microprocessor. Optionally, the general-purpose processor alternatively is any conventional processor, controller, microcontroller, or state machine. The processor alternatively is implemented by a combination of computing apparatuses, such as a digital signal processor and a microprocessor, a plurality of microprocessors, one or more microprocessors with a digital signal processor core, or any other similar configuration.

In one or more example designs, the functions described in this application is implemented by using hardware, software, firmware, or any combination thereof. If the functions are implemented by using software, these functions are stored in a computer-readable medium or transmitted as one or more instructions or code on a computer-readable medium. The computer-readable medium includes a computer storage medium or a communication medium that enables a computer program to move from one place to another place. The storage medium is any available medium accessible by a general-purpose computer or a special computer. For example, such a computer-readable medium includes but is not limited to a RAM, a ROM, an EEPROM, a CD-ROM or another optical disc storage, a disk storage or another magnetic storage apparatus, or any other medium that are used to carry or store program code, where the program code is in an instruction form or a data structure form or in a form that is read by a general-purpose or special computer or a general-purpose or special processor. In addition, any connection is appropriately set forth as a computer-readable medium. For example, if software is transmitted from a website, a server, or another remote resource by using a coaxial cable, an optical fiber computer, a twisted pair, a digital subscriber line (DSL); or in a wireless manner such as infrared, radio, or microwave, the software is included in the computer-readable medium. The disk (disk) and the disc (disc) include a compact disc, a laser disc, an optical disc, a digital versatile disc (English: Digital Versatile Disc, DVD for short), a floppy disk, and a Blu-ray disc. The disc usually copies data through a magnetic means, and the disk optically copies data through a laser means. The foregoing combination alternatively is included in the computer-readable medium.

A person of skill in the art is aware that in one or more of the foregoing examples, the functions described in this application is implemented by using hardware, software, firmware, or any combination thereof. When the functions are implemented by software, the foregoing functions are stored in a computer-readable medium or transmitted as one or more instructions or code on a computer-readable medium. The computer-readable medium includes a computer storage medium and a communication medium, where the communication medium includes any medium that facilitates transmission of a computer program from one place to another. The storage medium is any available medium accessible to a general-purpose or special-purpose computer.

Although this application is described with reference to features and embodiments thereof, various modifications and combinations are made to them without departing from the spirit and scope of this application is clear. Correspondingly, the specification and accompanying drawings are example descriptions of this application set forth by the appended claims, and are considered as any of or all modifications, variations, combinations, or equivalents that cover the scope of this application. A person skilled in the art is able to make various modifications and variations to this application without departing from the scope of this application. This application is intended to cover these modifications and variations of this application provided that these modifications and variations fall within the scope of the claims of this application and equivalent technologies.

The invention claimed is:

1. A communication method, comprising:

receiving, by a first node, a first message from a second node, wherein the first message includes
first indication information; wherein
the first message is not security protected, and
both the first node and the second node are integrated access and backhaul (IAB) nodes;

sending, by the first node to an IAB donor node, a second message, indicating that the first node received the first indication information, and the second message is security protected, wherein the second message requests the IAB donor node to verify whether the first indication information is trustworthy; and receiving, by the first node, a third message from the IAB donor node, wherein the third message includes second indication information indicating whether the first indication information is trustworthy, and the third message is security protected.

2. The method according to claim 1, wherein:
the first message further includes:
an identifier of a third node;
the first indication information indicates that a signal transmission exception occurs on the third node; and
the third node is an IAB node; and
the second message further includes the identifier of the third node indicating that the first node receives the first indication information from the third node.

3. The method according to claim 2, wherein:
the identifier of the third node is an address of the third node; or
the identifier of the third node is an identifier of a first path corresponding to the third node, the first path is a path on which the signal transmission exception occurs, and the first path includes the third node.

4. The method according to claim 1, wherein:
the second message includes third indication information indicating that the first node received the first indication information.

5. The method according to claim 1, wherein:
the first message is one of:
an internet protocol (IP) layer message;
an adaptation Adapt layer message;
a radio link control (RLC) message;
a media access control (MAC) message; or
a physical (PHY) layer message;
the second message is one of:
an F1 application protocol F1AP layer message;
a stream control transmission protocol (SCTP) layer message; or an internet protocol security (IPsec) layer message; and
the third message is one of:
an F1AP layer message;
an SCTP layer message; or
an IPsec layer message.

6. A communication method, comprising:

receiving, by an Integrated Access and Backhaul (IAB) donor node, a second message from a first node, wherein the second message indicates that the first node receives first indication information, the second message is security protected and requests to verify whether the first indication information is trustworthy, and wherein the first indication information is included in a first message sent from a second node without security protection, and both the first node and the second node are IAB nodes;

verifying, by the IAB donor node, whether the first indication information received by the first node is trustworthy; and sending, by the IAB donor node, a third message to the first node, wherein the third message includes second indication information indicating whether the first indication information is trustworthy, and the third message is security protected.

7. The method according to claim 6, wherein:
the second message further includes:
an identifier of a third node;
the identifier of the third node is an address of the third node or an identifier of a first path corresponding to the third node;
the first path is a path on which a signal transmission exception occurs;
and the first path includes the third node; and
the second message indicates that the first node receives the first indication information from the third node.

8. The method according to claim 7, wherein:
the determining, by the IAB donor node, whether the first indication information is trustworthy comprises:
in response to determining that the signal transmission exception occurs on the first path, determining, by the IAB donor node, that the first indication information is trustworthy.

9. The method according to claim 7, further comprising:
receiving, by the IAB donor node, fourth indication information from the third node, wherein the fourth indication information indicates that the signal transmission exception occurs on the first path.

10. The method according to claim 6, wherein:
the second message includes third indication information indicating that the first node receives the first indication information.

11. An apparatus comprising:
a processor coupled to a memory storing instructions and configured to execute the instructions to cause the processor to:
receive a first message from a second node, wherein the first message includes
first indication information; wherein
the first message is not security protected and
both the first node and the second node are integrated access and backhaul (IAB) node;
send a second message to an IAB donor node, wherein the second message is used to indicate that the apparatus received the first indication information, and the second message is security protected, wherein the second message requests the IAB donor node to verify whether the first indication information is trustworthy; and receive a third message from the IAB donor node, wherein the third message includes second indication information, the second indication information is used to indicate whether the first indication information is trustworthy, and the third message is security protected.

12. The apparatus according to claim 11, wherein: the first message further includes:

an identifier of a third node;

the first indication information is used to indicate that a signal transmission exception occurs on the third node; and the third node is an IAB node; and the second message further includes the identifier of the third node indicating that the first indication information was received from the third node.

13. The apparatus according to claim 12, wherein: the identifier of the third node is an address of the third node or an identifier of a first path corresponding to the third node, the first path is a path on which the signal transmission exception occurs, and the first path includes the third node.

14. The apparatus according to claim 11, wherein: the second message includes third indication information indicating that the first indication information was received.

15. The apparatus according to claim 11, wherein: the first message is one of:

an internet protocol (IP) layer message;

an adaptation Adapt layer message;

a radio link control (RLC) message;

a media access control (MAC) message; or a physical (PHY) layer message;

the second message is one of:

an F1 application protocol F1AP layer message;

a stream control transmission protocol (SCTP) layer message; or an internet protocol security (IPsec) layer message; and the third message is one of:

an F1AP layer message;

an SCTP layer message; or an IPsec layer message.

16. An apparatus comprising:

a processor coupled to a memory storing instructions and configured to execute the instructions to cause the processor to:

receive a second message from a first node, wherein the second message is used to indicate that the first node receives first indication information, the second message is security protected, and the first node is an Integrated Access and Backhaul (IAB) node, wherein the second message requests an IAB donor node to verify whether the first indication information is trustworthy;

wherein the first indication information is included in a first message sent from a second node without security protection, and the second node is an IAB node;

verify, by the IAB donor node, whether the first indication information is trustworthy; and send, by the IAB donor node, a third message to the first node, wherein the third message includes second indication information, the second indication information is used to indicate whether the first indication information is trustworthy, and the third message is security protected.

17. The apparatus according to claim 16, wherein: the second message further includes:

an identifier of a third node, the identifier of the third node is an address of the third node or an identifier of a first path corresponding to the third node, the first path is a path on which a signal transmission exception occurs, and the first path includes the third node; and the second message indicates that the first node receives the first indication information from the third node.

18. The apparatus according to claim 17, wherein the instructions further cause the processor to determine that the first indication information is trustworthy in response to determining that the signal transmission exception occurs on the first path.

19. The apparatus according to claim 17, wherein the instructions further cause the processor to receive fourth indication information from the third node, wherein the fourth indication information indicates that the signal transmission exception occurs on the first path.

20. The apparatus according to claim 16, wherein: the second message includes third indication information indicating that the first node receives the first indication information.

* * * * *